United States Patent
Cervelli et al.

(10) Patent No.: US 11,035,690 B2
(45) Date of Patent: *Jun. 15, 2021

(54) GEOTAGGING STRUCTURED DATA

(71) Applicant: Palantir Technologies, Inc., Palo Alto, CA (US)

(72) Inventors: Daniel P. Cervelli, Mountain View, CA (US); John Antonio Carrino, Palo Alto, CA (US)

(73) Assignee: Palantir Technologies Inc., Palo Alto, CA (US)

(*) Notice: Subject to any disclaimer, the term of this patent is extended or adjusted under 35 U.S.C. 154(b) by 163 days.

This patent is subject to a terminal disclaimer.

(21) Appl. No.: 16/387,412

(22) Filed: Apr. 17, 2019

(65) Prior Publication Data

US 2019/0242719 A1    Aug. 8, 2019

Related U.S. Application Data

(63) Continuation of application No. 14/818,102, filed on Aug. 4, 2015, now abandoned, which is a
(Continued)

(51) Int. Cl.
*G01C 21/36* (2006.01)
*G06F 16/29* (2019.01)
*G06F 16/50* (2019.01)

(52) U.S. Cl.
CPC ......... *G01C 21/3664* (2013.01); *G06F 16/29* (2019.01); *G06F 16/50* (2019.01)

(58) Field of Classification Search
None
See application file for complete search history.

(56) References Cited

U.S. PATENT DOCUMENTS 4,899,161 A    2/1990 Morin et al.
4,958,305 A    9/1990 Piazza
(Continued)

FOREIGN PATENT DOCUMENTS

AU    2012216622    5/2015
CN    102546446    7/2012
(Continued)

OTHER PUBLICATIONS

Huang et al., "Systematic and Integrative Analysis of Large Gene Lists Using DAVID Bioinformatics Resources," Nature Protocols, 4.1, 2008, 44-57.
(Continued)

*Primary Examiner* — Uyen T Le
(74) *Attorney, Agent, or Firm* — Hickman Becker Bingham Ledesma

(57) ABSTRACT

A mapping system comprising processes for creating and displaying structured geotagged data using interactive digital geographic imagery is disclosed. In one embodiment, a mapping system comprises processes and logic for creating a geo tag for structured data. A user creates a geo tag for a property of an object by selecting a geographic location on an interactive digital map and selecting the property of the object from a dialog presented to the user in response to selecting the geographic location. In this way, the user can more quickly and easily create structured geotagged data than can be accomplished using typical approaches requiring the user to manually enter geographic coordinates to associate a geographic location with structured data.

20 Claims, 12 Drawing Sheets

Related U.S. Application Data continuation of application No. 12/840,673, filed on Jul. 21, 2010, now Pat. No. 9,104,695.

(60) Provisional application No. 61/228,935, filed on Jul. 27, 2009.

(56) References Cited

U.S. PATENT DOCUMENTS

| | | |
|---|---|---|
| 5,329,108 A | 7/1994 | Lamoure |
| 5,754,182 A | 5/1998 | Kobayashi |
| 5,781,195 A | 7/1998 | Marvin |
| 5,781,704 A | 7/1998 | Rossmo |
| 6,091,956 A | 7/2000 | Hollenberg |
| 6,157,747 A | 12/2000 | Szeliski et al. |
| 6,169,552 B1 | 1/2001 | Endo et al. |
| 6,173,067 B1 | 1/2001 | Payton et al. |
| 6,178,432 B1 | 1/2001 | Cook et al. |
| 6,247,019 B1 | 6/2001 | Davies |
| 6,389,289 B1 | 5/2002 | Voce et al. |
| 6,414,683 B1 | 7/2002 | Gueziec |
| 6,430,305 B1 | 8/2002 | Decker |
| 6,483,509 B1 | 11/2002 | Rabenhorst |
| 6,529,900 B1 | 3/2003 | Patterson et al. |
| 6,631,496 B1 | 10/2003 | Li et al. |
| 6,662,103 B1 | 12/2003 | Skolnick et al. |
| 6,757,445 B1 | 6/2004 | Knopp |
| 6,828,920 B2 | 12/2004 | Owen et al. |
| 6,978,419 B1 | 12/2005 | Kantrowitz |
| 6,983,203 B1 | 1/2006 | Wako |
| 6,985,950 B1 | 1/2006 | Hanson et al. |
| 7,036,085 B2 | 4/2006 | Barros |
| 7,158,878 B2 | 1/2007 | Rasmussen et al. |
| 7,168,039 B2 | 1/2007 | Bertram |
| 7,375,732 B2 | 5/2008 | Arcas |
| 7,379,811 B2 | 5/2008 | Rasmussen et al. |
| 7,457,706 B2 | 11/2008 | Malero et al. |
| 7,502,786 B2 | 3/2009 | Liu et al. |
| 7,519,470 B2 | 4/2009 | Brasche et al. |
| 7,529,195 B2 | 5/2009 | Gorman |
| 7,539,666 B2 | 5/2009 | Ashworth et al. |
| 7,558,677 B2 | 6/2009 | Jones |
| 7,574,428 B2 | 8/2009 | Leiserowitz et al. |
| 7,579,965 B2 | 8/2009 | Bucholz |
| 7,617,232 B2 | 11/2009 | Gabbert et al. |
| 7,617,314 B1 | 11/2009 | Bansod et al. |
| 7,620,628 B2 | 11/2009 | Kapur et al. |
| 7,663,621 B1 | 2/2010 | Allen et al. |
| 7,791,616 B2 | 9/2010 | Ioup et al. |
| 7,805,457 B1 | 9/2010 | Viola et al. |
| 7,809,703 B2 | 10/2010 | Balabhadrapatruni et al. |
| 7,872,647 B2 | 1/2011 | Mayer et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 8,085,268 B2 | 4/2011 | Carrino et al. |
| 7,941,321 B2 | 5/2011 | Greenstein et al. |
| 7,945,852 B1 | 5/2011 | Pilskains |
| 7,962,281 B2 | 6/2011 | Rasmussen et al. |
| 7,970,240 B1 | 6/2011 | Chao et al. |
| 8,010,545 B2 | 8/2011 | Stefik et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,065,080 B2 | 11/2011 | Koch |
| 8,134,457 B2 | 3/2012 | Velipasalar et al. |
| 8,145,703 B2 | 3/2012 | Frishert et al. |
| 8,200,676 B2 | 6/2012 | Frank |
| 8,214,361 B1 | 7/2012 | Sandler et al. |
| 8,214,764 B2 | 7/2012 | Gemmell et al. |
| 8,229,902 B2 | 7/2012 | Vishniac et al. |
| 8,229,947 B2 | 7/2012 | Fujinaga |
| 8,230,333 B2 | 7/2012 | Decherd |
| 8,290,838 B1 | 10/2012 | Thakur et al. |
| 8,290,942 B2 | 10/2012 | Jones et al. |
| 8,290,943 B2 | 10/2012 | Carbone et al. |
| 8,301,464 B1 | 10/2012 | Cave et al. |
| 8,302,855 B2 | 11/2012 | Ma et al. |
| 8,325,178 B1 | 12/2012 | Doyle, Jr. |
| 8,368,695 B2 | 2/2013 | Howell et al. |
| 8,397,171 B2 | 3/2013 | Klassen et al. |
| 8,400,448 B1 | 3/2013 | Doyle, Jr. |
| 8,407,180 B1 | 3/2013 | Ramesh et al. |
| 8,412,234 B1 | 4/2013 | Gatmir-Motahair et al. |
| 8,412,707 B1 | 4/2013 | Mianji |
| 8,422,825 B1 | 4/2013 | Neophytou et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,514,229 B2 | 8/2013 | Cervelli et al. |
| 8,515,207 B2 | 8/2013 | Chau |
| 8,564,596 B2 | 10/2013 | Carrino et al. |
| 8,589,273 B2 | 11/2013 | Creeden et al. |
| 8,688,573 B1 | 4/2014 | Rukonic et al. |
| 8,742,934 B1 | 6/2014 | Sarpy et al. |
| 8,781,169 B2 | 7/2014 | Jackson et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 8,983,494 B1 | 3/2015 | Onnen et al. |
| 9,009,177 B2 | 4/2015 | Zheng et al. |
| 9,021,384 B1 | 4/2015 | Beard et al. |
| 9,104,293 B1 | 8/2015 | Kornfeld et al. |
| 9,104,695 B1 | 8/2015 | Cervelli et al. |
| 9,111,380 B2 | 8/2015 | Piemonte et al. |
| 9,129,219 B1 | 9/2015 | Robertson et al. |
| 9,146,125 B2 | 9/2015 | Vulcano et al. |
| 9,280,618 B1 | 3/2016 | Bruce et al. |
| 2002/0003539 A1 | 1/2002 | Abe |
| 2002/0033848 A1 | 3/2002 | Sciammarella et al. |
| 2002/0055924 A1* | 5/2002 | Liming ............... H04L 67/18 |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0130867 A1 | 9/2002 | Yang et al. |
| 2002/0130906 A1 | 9/2002 | Miyaki |
| 2002/0147805 A1 | 10/2002 | Leshem et al. |
| 2003/0009493 A1 | 1/2003 | Parker |
| 2003/0052896 A1 | 3/2003 | Higgins et al. |
| 2003/0103049 A1 | 6/2003 | Kindratenko et al. |
| 2003/0126102 A1 | 7/2003 | Borthwick |
| 2003/0144868 A1 | 7/2003 | MacIntyre et al. |
| 2003/0163352 A1 | 8/2003 | Surpin et al. |
| 2003/0200192 A1 | 10/2003 | Bell |
| 2003/0225755 A1 | 12/2003 | Iwayama et al. |
| 2004/0030492 A1 | 2/2004 | Fox et al. |
| 2004/0034570 A1 | 2/2004 | Davis |
| 2004/0039498 A1 | 2/2004 | Ollis et al. |
| 2004/0098236 A1 | 5/2004 | Mayer et al. |
| 2004/0143602 A1 | 7/2004 | Ruiz et al. |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0023354 A1 | 2/2005 | Sali |
| 2005/0031197 A1 | 2/2005 | Knopp |
| 2005/0034062 A1 | 2/2005 | Bufkin et al. |
| 2005/0080769 A1 | 4/2005 | Gemmell |
| 2005/0086207 A1 | 4/2005 | Heuer et al. |
| 2005/0162523 A1 | 7/2005 | Darrell et al. |
| 2005/0182502 A1 | 8/2005 | Iyengar |
| 2005/0182793 A1 | 8/2005 | Keenan et al. |
| 2005/0223044 A1 | 10/2005 | Ashworth et al. |

(56) References Cited

U.S. PATENT DOCUMENTS

| | | |
|---|---|---|
| 2005/0267652 A1 | 12/2005 | Allstadt et al. |
| 2006/0026120 A1 | 2/2006 | Carolan et al. |
| 2006/0026170 A1 | 2/2006 | Kreitler et al. |
| 2006/0090141 A1 | 4/2006 | Loui |
| 2006/0139375 A1 | 6/2006 | Rasmussen et al. |
| 2006/0143075 A1 | 6/2006 | Carr et al. |
| 2006/0143079 A1 | 6/2006 | Basak et al. |
| 2006/0146050 A1 | 7/2006 | Yamauchi |
| 2006/0149596 A1 | 7/2006 | Surpin et al. |
| 2006/0200384 A1 | 9/2006 | Arutunian et al. |
| 2006/0241974 A1 | 10/2006 | Chao et al. |
| 2006/0251307 A1 | 11/2006 | Florin et al. |
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0024620 A1 | 2/2007 | Muller-Fischer et al. |
| 2007/0057966 A1 | 3/2007 | Ohno et al. |
| 2007/0078832 A1 | 4/2007 | Ott et al. |
| 2007/0115373 A1 | 5/2007 | Gallagher et al. |
| 2007/0188516 A1 | 8/2007 | Loup et al. |
| 2007/0208497 A1 | 9/2007 | Downs et al. |
| 2007/0208498 A1 | 9/2007 | Barker et al. |
| 2007/0258642 A1 | 11/2007 | Thota |
| 2007/0284433 A1 | 12/2007 | Domenica et al. |
| 2007/0294643 A1 | 12/2007 | Kyle |
| 2008/0010605 A1 | 1/2008 | Frank |
| 2008/0040678 A1 | 2/2008 | Crump |
| 2008/0040684 A1 | 2/2008 | Crump |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0132251 A1 | 6/2008 | Altman |
| 2008/0133579 A1 | 6/2008 | Lim |
| 2008/0163073 A1 | 7/2008 | Becker et al. |
| 2008/0192053 A1 | 8/2008 | Howell et al. |
| 2008/0195417 A1 | 8/2008 | Surpin et al. |
| 2008/0222295 A1 | 9/2008 | Robinson et al. |
| 2008/0223834 A1 | 9/2008 | Griffiths et al. |
| 2008/0229056 A1 | 9/2008 | Agarwal et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0106178 A1 | 4/2009 | Chu |
| 2009/0112745 A1 | 4/2009 | Stefanescu |
| 2009/0115786 A1 | 5/2009 | Shmiaski et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0222400 A1 | 9/2009 | Kupershmidt et al. |
| 2009/0249244 A1 | 10/2009 | Robinson et al. |
| 2009/0271343 A1 | 10/2009 | Vaiciulis et al. |
| 2009/0292626 A1 | 11/2009 | Oxford |
| 2009/0300528 A1 | 12/2009 | Stambaugh |
| 2009/0307049 A1 | 12/2009 | Elliott et al. |
| 2009/0313463 A1 | 12/2009 | Pang et al. |
| 2009/0319418 A1 | 12/2009 | Herz |
| 2010/0042922 A1 | 2/2010 | Bradeteanu et al. |
| 2010/0057622 A1 | 3/2010 | Faith et al. |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0070842 A1 | 3/2010 | Aymeloglu et al. |
| 2010/0076968 A1 | 3/2010 | Boyns et al. |
| 2010/0098318 A1 | 4/2010 | Anderson |
| 2010/0106420 A1 | 4/2010 | Mattikalli et al. |
| 2010/0161735 A1 | 6/2010 | Sharma |
| 2010/0162176 A1 | 6/2010 | Dunton |
| 2010/0185692 A1 | 7/2010 | Zhang et al. |
| 2010/0185984 A1* | 7/2010 | Wright .............. G06F 16/29 715/833 |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0262688 A1 | 10/2010 | Hussain et al. |
| 2010/0277611 A1 | 11/2010 | Holt et al. |
| 2010/0293174 A1 | 11/2010 | Bennett et al. |
| 2010/0321399 A1 | 12/2010 | Ellren et al. |
| 2011/0022312 A1 | 1/2011 | McDonough et al. |
| 2011/0061013 A1 | 3/2011 | Billicki et al. |
| 2011/0078173 A1 | 3/2011 | Seligmann et al. |
| 2011/0090254 A1 | 4/2011 | Carrino et al. |
| 2011/0093327 A1 | 4/2011 | Fordyce et al. |
| 2011/0099133 A1 | 4/2011 | Chang et al. |
| 2011/0117878 A1 | 5/2011 | Barash et al. |
| 2011/0137766 A1 | 6/2011 | Rasmussen et al. |
| 2011/0153368 A1 | 6/2011 | Pierre et al. |
| 2011/0153384 A1 | 6/2011 | Horne et al. |
| 2011/0161096 A1 | 6/2011 | Buehler et al. |
| 2011/0170799 A1 | 7/2011 | Carrino et al. |
| 2011/0173093 A1 | 7/2011 | Psota et al. |
| 2011/0208724 A1 | 8/2011 | Jones et al. |
| 2011/0218934 A1 | 9/2011 | Elser |
| 2011/0225198 A1 | 9/2011 | Edwards et al. |
| 2011/0238690 A1 | 9/2011 | Arrasvuori et al. |
| 2011/0270604 A1 | 11/2011 | Qi et al. |
| 2011/0270705 A1 | 11/2011 | Parker |
| 2011/0289397 A1 | 11/2011 | Eastmond et al. |
| 2011/0314007 A1 | 12/2011 | Dassa et al. |
| 2012/0011238 A1 | 1/2012 | Rathod |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0079363 A1 | 3/2012 | Folting et al. |
| 2012/0084118 A1 | 4/2012 | Bai et al. |
| 2012/0106801 A1 | 5/2012 | Jackson |
| 2012/0131512 A1 | 5/2012 | Takeuchi et al. |
| 2012/0144335 A1 | 6/2012 | Abeln et al. |
| 2012/0158527 A1 | 6/2012 | Cannelongo et al. |
| 2012/0159362 A1 | 6/2012 | Brown et al. |
| 2012/0159363 A1 | 6/2012 | DeBacker et al. |
| 2012/0173381 A1 | 7/2012 | Smith |
| 2012/0173985 A1 | 7/2012 | Peppel |
| 2012/0206469 A1 | 8/2012 | Hulubei et al. |
| 2012/0208636 A1 | 8/2012 | Feige |
| 2012/0221553 A1 | 8/2012 | Wittmer et al. |
| 2012/0221580 A1 | 8/2012 | Barney |
| 2012/0323888 A1 | 12/2012 | Osann, Jr. |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0096988 A1 | 4/2013 | Grossman et al. |
| 2013/0100134 A1 | 4/2013 | Cervelli et al. |
| 2013/0101159 A1 | 4/2013 | Chao et al. |
| 2013/0132398 A1 | 5/2013 | Pfiefle |
| 2013/0150004 A1 | 6/2013 | Rosen |

(56) References Cited

U.S. PATENT DOCUMENTS

| | | |
|---|---|---|
| 2013/0151453 A1 | 6/2013 | Bhanot et al. |
| 2013/0166480 A1 | 6/2013 | Popescu et al. |
| 2013/0176321 A1 | 7/2013 | Mitchell et al. |
| 2013/0179420 A1 | 7/2013 | Park et al. |
| 2013/0185307 A1 | 7/2013 | El-Yaniv et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0254900 A1 | 9/2013 | Sathish et al. |
| 2013/0263019 A1 | 10/2013 | Castellanos et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0282723 A1 | 10/2013 | Petersen et al. |
| 2013/0290825 A1 | 10/2013 | Arndt et al. |
| 2013/0297619 A1 | 11/2013 | Chandrasekaran et al. |
| 2013/0339891 A1 | 12/2013 | Blumenberg et al. |
| 2014/0012796 A1 | 1/2014 | Petersen et al. |
| 2014/0040371 A1 | 2/2014 | Gurevich et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0157172 A1 | 6/2014 | Peery et al. |
| 2014/0164502 A1 | 6/2014 | Khodorenko et al. |
| 2014/0176606 A1 | 6/2014 | Narayan et al. |
| 2014/0189536 A1 | 7/2014 | Lange et al. |
| 2014/0195515 A1 | 7/2014 | Baker et al. |
| 2014/0218400 A1 | 8/2014 | O'Toole et al. |
| 2014/0222793 A1 | 8/2014 | Sadkin et al. |
| 2014/0333651 A1 | 11/2014 | Cervelli et al. |
| 2014/0337772 A1 | 11/2014 | Cervelli et al. |
| 2014/0358829 A1 | 12/2014 | Hurwitz |
| 2014/0361899 A1 | 12/2014 | Layson |
| 2014/0366132 A1 | 12/2014 | Stiansen et al. |
| 2015/0029176 A1 | 1/2015 | Baxter et al. |
| 2015/0100897 A1 | 4/2015 | Sun et al. |
| 2015/0100907 A1 | 4/2015 | Erenrich et al. |
| 2015/0106170 A1 | 4/2015 | Bonica |
| 2015/0106379 A1 | 4/2015 | Elliot et al. |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0188872 A1 | 7/2015 | White |
| 2015/0312323 A1 | 10/2015 | Peterson |
| 2015/0338233 A1 | 11/2015 | Cervelli et al. |
| 2015/0379413 A1 | 12/2015 | Robertson et al. |

FOREIGN PATENT DOCUMENTS

| | | |
|---|---|---|
| CN | 103167093 | 6/2013 |
| CN | 102054015 | 5/2014 |
| DE | 102014204827 | 9/2014 |
| DE | 102014204830 | 9/2014 |
| DE | 102014204834 | 9/2014 |
| DE | 102013222023 | 1/2015 |
| EP | 0763201 | 3/1997 |
| EP | 2575107 | 4/2013 |
| EP | 2858014 | 4/2015 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| GB | 2516155 | 1/2015 |
| NL | 2012778 | 11/2014 |
| NZ | 624557 | 12/2014 |
| WO | WO 1995/032424 | 11/1995 |
| WO | WO 2000/009529 | 2/2000 |
| WO | WO 2001/098925 | 12/2001 |
| WO | WO 2004/057268 | 7/2004 |
| WO | WO 2005/013200 | 2/2005 |
| WO | WO 2008/064207 | 5/2008 |
| WO | WO 2009/061501 | 5/2009 |
| WO | WO 2009/123975 | 10/2009 |
| WO | WO 2011/058507 | 5/2011 |

OTHER PUBLICATIONS

Official Communication for Netherlands Patent Application No. 2011632 dated Feb. 8, 2016.

Official Communication for Netherlands Patent Application No. 2012778 dated Sep. 22, 2015.

"A First Look: Predicting Market Demand for Food Retail using a Huff Analysis," TRF Policy Solutions, Jul. 2012, pp. 30.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

"Andy Turner's GISRUK 2012 Notes" <https://docs.google.com/document/d/1cTmxg7mVx5gd89lqblCYvCEnHA4QAivH4l4WpyPsqE4/edit?pli=1> printed Sep. 16, 2013 in 15 pages.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Barnes et al., "Viewshed Analysis", GIS-ARC/INFO 2001, <www.evsc.virginia.edu/~jhp7e/evsc466/student_pres/Rounds.pdf>.

Capptain—Pilot Your Apps, <http://www.capptain.com> Printed Jul. 18, 2013 in 6 pages.

Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Cohn et al., "Semi-supervised Clustering with User Feedback," Constrained Clustering: Advances in Algorithms, Theory, and Applications 4.1, 2003, pp. 17-32.

Countly Mobile Analytics, <http://count.ly/> Printed Jul. 18, 2013 in 9 pages.

Definition "Identify" downloaded Jan. 22, 2015, 1 page.

Definition "Overlay" downloaded Jan. 22, 2015, 1 page.

Distimo—App Analytics, <http://www.distimo.com/app-analytics> Printed Jul. 18, 2013 in 5 pages.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Flurry Analytics, <http://www.flurry.com/> Printed Jul. 18, 2013 in 14 pages.

Ghosh, P., "A Solution of Polygon Containment, Spatial Planning, and Other Related Problems Using Minkowski Operations," Computer Vision, Graphics, and Image Processing, 1990, vol. 49, pp. 1-35.

GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation," Grant 98-IJ-CX-K005, May 6, 2002, 37 pages.

Griffith, Daniel A., "A Generalized Huff Model," Geographical Analysis, Apr. 1982, vol. 14, No. 2, pp. 135-144.

(56) References Cited

OTHER PUBLICATIONS

Gu et al., "Record Linkage: Current Practice and Future Directions," Jan. 15, 2004, pp. 32.
Hansen et al. "Analyzing Social Media Networks with NodeXL: Insights from a Connected World", Chapter 4, pp. 53-67 and Chapter 10, pp. 143-164, published Sep. 2010.
Notice of Acceptance for Australian Patent Application No. 201221622 dated Jan. 6, 2015.
Official Communication for New Zealand Patent Application No. 628840 dated Aug. 28, 2014.
Official Communication for New Zealand Patent Application No. 628585 dated Aug. 26, 2014.
Official Communication for Great Britain Patent Application No. 1408025.3 dated Nov. 6, 2014.
Official Communication for Great Britain Patent Application No. 1404499.4 dated Jun. 11, 2015.
Official Communication for European Patent Application No. 14200298.9 dated May 13, 2015.
Official Communication for Australian Patent Application No. 2014202442 dated Mar. 19, 2015.
Official Communication for Australian Patent Application No. 2014213553 dated May 7, 2015.
Official Communication for European Patent Application No. 14187739.9 dated Jul. 6, 2015.
Official Communication for Great Britain Patent Application No. 1404499.4 dated Sep. 29, 2014.
Official Communication for Great Britain Patent Application No. 1404489.5 dated Oct. 6, 2014.
Official Communication for Great Britain Patent Application No. 1404486.1 dated Aug. 27, 2014.
Official Communication for Great Britain Patent Application No. 1404499.4 dated Aug. 20, 2014.
Official Communication for Great Britain Patent Application No. 1404489.5 dated Aug. 27, 2014.
Official Communication for New Zealand Patent Application No. 622473 dated Mar. 27, 2014.
Official Communication for New Zealand Patent Application No. 622473 dated Jun. 19, 2014.
Official Communication for New Zealand Patent Application No. 622513 dated Apr. 3, 2014.
Official Communication for New Zealand Patent Application No. 628161 dated Aug. 25, 2014.
Official Communication for European Patent Application No. 14187996.5 dated Feb. 12, 2015.
Official Communication for European Patent Application No. 14191540.5 dated May 27, 2015.
Official Communication for Great Britain Patent Application No. 1404486.1 dated May 21, 2015.
Official Communication for Great Britain Patent Application No. 1404489.5 dated May 21, 2015.
Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.
Sigrist et al., "PROSITE, a Protein Domain Database for Functional Characterization and Annotation," Nucleic Acids Research 38.Suppl 1, 2010, pp. D161-D166.
Snyder, "Map Projections—A Working Manual," U.S. Geological Survey Professional paper 1395, United States Government Printing Office, Washington: 1987, pp. 11-21 and 60-70.
Sonris, "Using the Area of Interest Tools," <http://web.archive.org/web/20061001053327/http://sonris-www.dnr.state.la.us/gis/instruct_files/tutslide12> printed Jan. 3, 2013 in 1 page.
StatCounter—Free Invisible Web Tracker, Hit Counter and Web Stats, <http://statcounter.com/> Printed Jul. 19, 2013 in 17 pages.
Tangelder et al., "Freeform Shape Matching Using Minkowski Operations," The Netherlands, Jun. 1996, pp. 12.
TestFlight—Beta Testing on the Fly, <http://testflightapp.com/> Printed Jul. 18, 2013 in 3 pages.
Thompson, Mick, "Getting Started with GEO," Getting Started with GEO, Jul. 26, 2011.
Trak.io, <http://trak.io/> printed Jul. 18, 2013 in 3 pages.
"Using the Area of Interest Tools," dated Oct. 1, 2006, http://web.archive.org/web/200610010533327/http://sonris-www.dnr.state.la.us.gis/instruct_files/tutslide12.thm.
UserMetrix, <http://usermetrix.com/android-analytics> printed Jul. 18, 2013 in 3 pages.
Valentini et al., "Ensembles of Learning Machines," M. Marinaro and R. Tagliaferri (Eds.): Wirn Vietri 2002, LNCS 2486, pp. 3-20.
VB Forums, "Buffer a Polygon," Internet Citation, <http://www.vbforums.com/showthread.php?198436-Buffer-a-Polygon>, Specifically Thread #1, #5 & #11 retrieved on May 2, 2013, pp. 8.
Vivid Solutions, "JTS Topology Suite: Technical Specifications," <http://www.vividsolutions.com/jts/bin/JTS%20Technical%20Specs.pdf> Version 1.4, 2003, pp. 36.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Douglas—Peucker-Algorithms," <http://de.wikipedia.org/w/index.php?title=Douglas-Peucker-Algorithmus&oldid=91846042> printed Jul. 2011, pp. 2.
Wikipedia, "Ramer—Douglas—Peucker Algorithm," <http://en.wikipedia.org/wiki/Ramer%E2%80%93Douglas%E2%80%93Peucker_algorithm> printed Jul. 2011, pp. 3.
Wongsuphasawat et al., "Visual Analytics for Transportation Incident Data Sets," Transportation Research Record 2138, 2009, pp. 135-145.
Woodbridge, Stephen, "[geos-devel] Polygon simplification," <http://lists.osgeo.org/pipermail/geos-devel/2011-May/005210.html> dated May 8, 2011, pp. 3.
Haralick et al., "Image Analysis Using Mathematical Morphology," Pattern Analysis and Machine Intelligence, IEEE Transactions, Jul. 1987, vol. PAMI-9, No. 4, pp. 532-550.
Hibbert et al., "Prediction of Shopping Behavior Using a Huff Model Within a GIS Framework," Healthy Eating in Context, Mar. 18, 2011, pp. 16.
Hua et al., "A Multi-attribute Data Structure with Parallel Bloom Filters for Network Services" HiPC 2006, LNCS 4297, pp. 277-288, 2006.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Ipbucker, C., "Inverse Transformation for Several Pseudo-cylindrical Map Projections Using Jacobian Matrix," ICCSA 2009, Part 1 LNCS 5592, pp. 553-564.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Levine, N., "Crime Mapping and the Crimestat Program," Geographical Analysis, 2006, vol. 38, pp. 41-56.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, <http://www.localytics.com/> Printed Jul. 18, 2013 in 12 pages.

(56) References Cited

OTHER PUBLICATIONS

Mandagere, Nagapramod, "Buffer Operations in GIS," <http://www-users.cs.umn.edu/~npramod/enc_pdf.pdf> retrieved Jan. 28, 2010, pp. 7.
Manno et al., "Introducing Collaboration in Single-user Applications through the Centralized Control Architecture," 2010, pp. 10.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Mixpanel—Mobile Analytics, <https://mixpanel.com/> Printed Jul. 18, 2013 in 13 pages.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Open Street Map, "Amm's Diary:Unconnected ways and other data quality issues," http://www.openstreetmap.org/user/amm/diary printed Jul. 23, 2012 in 3 pages.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in18 pages.
POI Editor, "How to: Create Your Own Points of Interest," <http://www.poieditor.com/articles/how_to__create_your_own_points_of_interest/> printed Jul. 22, 2012 in 4 pages.
Pozzi et al., "Vegetation and Population Density in Urban and Suburban Areas in the U.S.A." Third International Symposium of Remote Sensing of Urban Areas Istanbul, Turkey, Jun. 2002, pp. 8.
Qiu, Fang, "3d Analysis and Surface Modeling", <http://web.archive.org/web/20091202221925/http://www.utsa.edu/lrsg/Teaching/EES6513/08-3D.pdf> printed Sep. 16, 2013 in 26 pages.
Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Reibel et al., "Areal Interpolation of Population Counts Using Pre-classified Land Cover Data," Population Research and Policy Review, 2007, vol. 26, pp. 619-633.
Reibel, M., "Geographic Information Systems and Spatial Data Processing in Demography: a Review," Population Research and Policy Review, 2007, vol. 26, pp. 601-618.
U.S. Appl. No. 14/934,004, filed Nov. 5, 2015, First Office Action Interview, dated Feb. 16, 2016.
U.S. Appl. No. 14/730,123, filed Jun. 3, 2015, First Office Action Interview, dated Sep. 21, 2015.
U.S. Appl. No. 14/929,584, filed Nov. 2, 2015, Office Action, dated Feb. 4, 2016.
U.S. Appl. No. 14/289,599, filed May 28, 2014, Advisory Action, dated Sep. 4, 2015.
U.S. Appl. No. 14/319,161, filed Jun. 30, 2014, Notice of Allowance, dated May 4, 2015.
U.S. Appl. No. 14/730,123, filed Jun. 3, 2015, Notice of Allowance, dated Apr. 12, 2016.
U.S. Appl. No. 14/490,612, filed Sep. 18, 2014, Final Office Action, dated Aug. 18, 2015.
U.S. Appl. No. 14/289,596, filed May 28, 2014, Office Action, dated May 9, 2016.
U.S. Appl. No. 14/929,584, filed Nov. 2, 2015, Final Office Action, dated May 25, 2016.
U.S. Appl. No. 13/728,879, filed Dec. 27, 2012, Notice of Allowance, dated Jun. 21, 2016.
U.S. Appl. No. 12/840,673, filed Jul. 21, 2010, Final Office Action, dated Jan. 2, 2015.
U.S. Appl. No. 12/840,673, filed Jul. 21, 2010, Notice of Allowance, dated Apr. 6, 2015.
U.S. Appl. No. 12/840,673, filed Jul. 21, 2010, Office Action, dated Sep. 17, 2014.
U.S. Appl. No. 13/728,879, filed Dec. 27, 2012, First Office Action Interview, dated Jan. 27, 2015.
U.S. Appl. No. 13/728,879, filed Dec. 27, 2012, Interview Summary, dated Mar. 17, 2015.
U.S. Appl. No. 13/827,491, filed Mar. 14, 2013, Office Action, dated Dec. 1, 2014.
U.S. Appl. No. 13/827,491, filed Mar. 14, 2013, Final Office Action, dated Jun. 22, 2015.
U.S. Appl. No. 13/948,859, filed Jul. 23, 2013, Notice of Allowance, dated Dec. 10, 2014.
U.S. Appl. No. 14/225,006, filed Mar. 25, 2014, First Office Action Interview, dated Sep. 10, 2014.
U.S. Appl. No. 14/225,006, filed Mar. 25, 2014, First Office Action Interview, dated Feb. 27, 2015.
U.S. Appl. No. 14/225,084, filed Mar. 25, 2014, First Office Action Interview, dated Sep. 2, 2014.
U.S. Appl. No. 14/225,084, filed Mar. 25, 2014, Notice of Allowance, dated May 4, 2015.
U.S. Appl. No. 14/225,084, filed Mar. 25, 2014, First Office Action Interview, dated Feb. 20, 2015.
U.S. Appl. No. 14/225,160, filed Mar. 25, 2014, Final Office Action, dated Feb. 11, 2015.
U.S. Appl. No. 14/225,160, filed Mar. 25, 2014, Advisory Action, dated May 20, 2015.
U.S. Appl. No. 14/225,160, filed Mar. 25, 2014, First Office Action Interview, dated Oct. 22, 2014.
U.S. Appl. No. 14/225,160, filed Mar. 25, 2014, First Office Action Interview, dated Jul. 29, 2014.
U.S. Appl. No. 14/289,596, filed May 28, 2014, First Office Action Interview, dated Jul. 18, 2014.
U.S. Appl. No. 14/289,596, filed May 28, 2014, Final Office Action, dated Jan. 26, 2015.
U.S. Appl. No. 14/289,596, filed May 28, 2014, Advisory Action, dated Apr. 30, 2015.
U.S. Appl. No. 14/289,599, filed May 28, 2014, First Office Action Interview, dated Jul. 22, 2014.
U.S. Appl. No. 14/289,599, filed May 28, 2014, Final Office Action, dated May 29, 2015.
U.S. Appl. No. 14/294,098, filed Jun. 2, 2014, Final Office Action, dated Nov. 6, 2014.
U.S. Appl. No. 14/294,098, filed Jun. 2, 2014, First Office Action Interview, dated Aug. 15, 2014.
U.S. Appl. No. 14/294,098, filed Jun. 2, 2014, Notice of Allowance, dated Dec. 29, 2014.
U.S. Appl. No. 14/319,161, filed Jun. 30, 2014, Final Office Action, dated Jan. 23, 2015.
U.S. Appl. No. 14/451,221, filed Aug. 4, 2014, Office Action, dated Oct. 21, 2014.
U.S. Appl. No. 14/463,615, filed Aug. 19, 2014, First Office Action Interview, dated Nov. 13, 2014.
U.S. Appl. No. 14/463,615, filed Aug. 19, 2014, Final Office Action, dated May 21, 2015.
U.S. Appl. No. 14/463,615, filed Aug. 19, 2014, First Office Action Interview, dated Jan. 28, 2015.
U.S. Appl. No. 14/479,863, filed Sep. 8, 2014, First Office Action Interview, dated Dec. 26, 2014.
U.S. Appl. No. 14/479,863, filed Sep. 8, 2014, Notice of Allowance, dated Mar. 31, 2015.
U.S. Appl. No. 14/483,527, filed Sep. 11, 2014, Final Office Action, dated Jun. 22, 2015.
U.S. Appl. No. 14/483,527, filed Sep. 11, 2014, First Office Action Interview, dated Jan. 28, 2015.
U.S. Appl. No. 14/552,336, filed Nov. 24, 2014, First Office Action Interview, dated Jul. 20, 2015.

(56) References Cited

OTHER PUBLICATIONS

U.S. Appl. No. 14/571,098, filed Dec. 15, 2014, First Office Action Interview, dated Aug. 5, 2015.
U.S. Appl. No. 14/571,098, filed Dec. 15, 2014, First Office Action Interview, dated Mar. 11, 2015.
U.S. Appl. No. 14/818,102, filed Aug. 4, 2015, Final Office Action, dated Jan. 17, 2019.
U.S. Appl. No. 14/818,102, filed Aug. 4, 2015, Final Office Action, dated Jan. 25, 2018.
U.S. Appl. No. 14/818,102, filed Aug. 4, 2015, Final Office Action, dated Feb. 27, 2017.
U.S. Appl. No. 14/818,102, filed Aug. 4, 2015, Office Action, dated Jun. 6, 2017.
U.S. Appl. No. 14/818,102, filed Aug. 4, 2015, Office Action, dated Aug. 17, 2017.
U.S. Appl. No. 14/818,102, filed Aug. 4, 2015, Office Action, dated Nov. 29, 2019.
U.S. Appl. No. 14/818,102, filed Aug. 4, 2015, First Office Action Interview, dated Sep. 13, 2016.

* cited by examiner

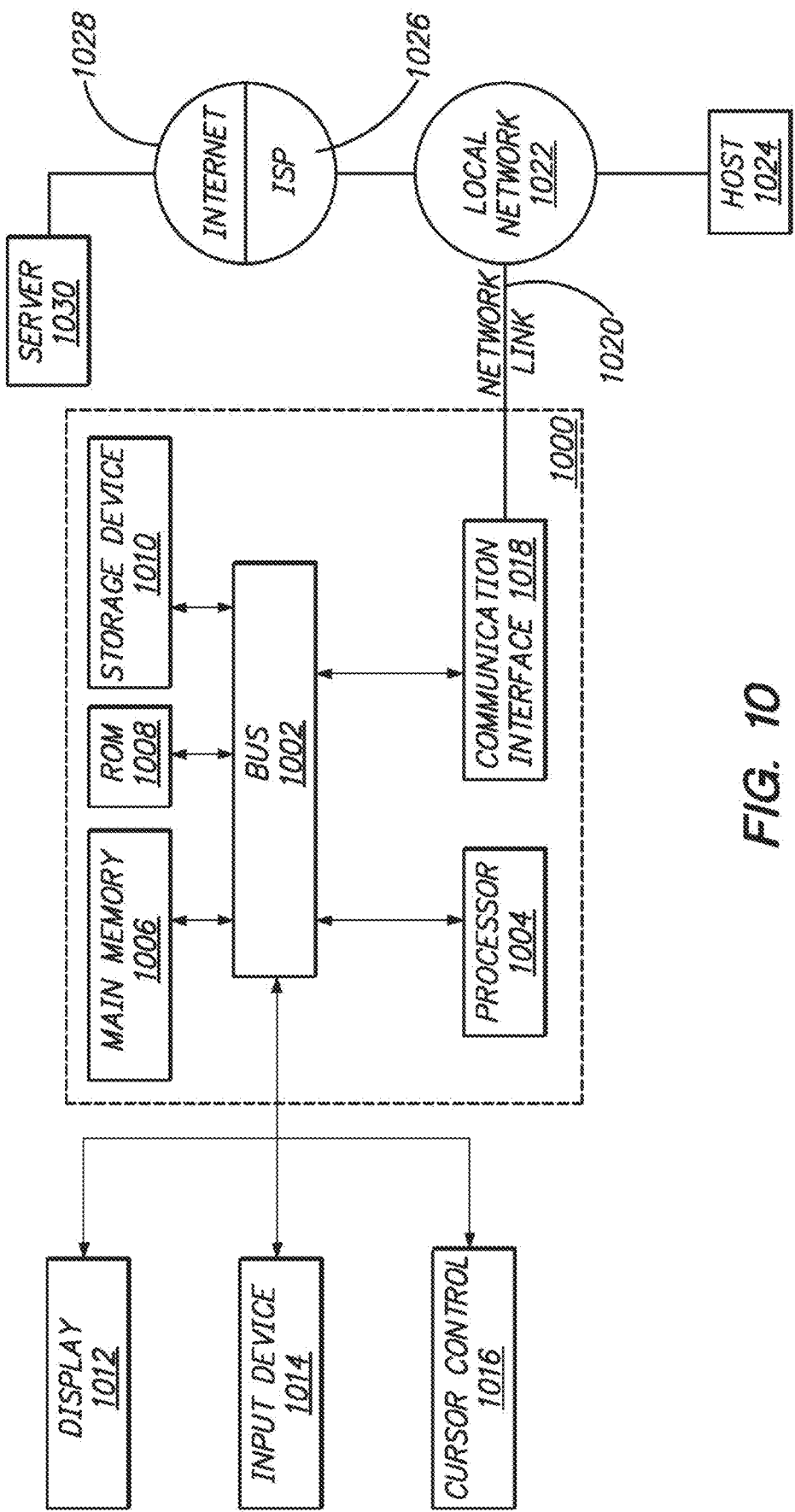

GEOTAGGING STRUCTURED DATA

BENEFIT CLAIM

This application claims the benefit under 35 U.S.C. § 120 as a Continuation of application Ser. No. 14/818,102, filed Aug. 4, 2015, which claims the benefit under 35 U.S.C. § 120 as a Continuation of application Ser. No. 12/840,673, filed Jul. 21, 2010, which claims the benefit under 35 U.S.C. § 119(e) of provisional application 61/228,935, filed Jul. 27, 2009, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright© 2009-2010 Palantir Technologies, Inc.

TECHNICAL FIELD

The invention is related to creating and displaying data with the use of digital maps, and more particularly to computer processes and logic for creating and displaying structured geotagged data with the use of interactive digital geographic imagery.

BACKGROUND

Mapping computer systems ("mapping systems") display digital geographic imagery of the Earth at varying perspectives including providing users an oblique view (e.g. bird's eye-view) of objects on the surface of the Earth such as houses, buildings, roads, lakes, mountains, and the like. Such geographic imagery may comprise satellite imagery, aerial photography, and the like. Since the Earth is a curved generally spherical object, the geographic images are rectified by the mapping systems so that the mapping systems can project the images onto a two-dimensional (2-D) plane such as a computer display screen. Mapping systems may use a coordinate system to identify a point on the surface of the Earth. One common coordinate system is geographic coordinates (latitude/longitude) on the World Geodetic System of 1984 (WGS84) datum. Latitude is an angular measurement in degrees ranging from 0 degrees at the Earth's equator to 90 degrees at the poles. Longitude is also an angular measurement but measured East or West instead of North or South. For example, the location of White House in Washington D.C. on the surface of the Earth as identified by a geographic coordinate is 38.898748 degrees latitude and −77.037684 degrees longitude.

It is often desirable to associate a geographic location with a piece of data and then display the data as a superimposition on digital geographic imagery. For example, it may be desirable to associate a geographic location with a street address such that when a map image of the street is displayed the address can be visually indicated by superimposing the text of the address, a symbol or other indicator on the map at the geographic location. The process of associating a geographic location with a piece of data, typically in the form of geographic coordinates (e.g., latitude/longitude), is known as geotagging. One approach for geotagging typically involves a user identifying the geographic coordinates of a particular location using a mapping system and then manually entering the coordinates into a database containing the one piece of data that is to be geotagged. However, this manual approach is awkward and inconvenient for the user and is a serious drawback for organizations that require geotagging of many thousands or many millions of pieces of data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 10 illustrates a computer system with which an embodiment may be implemented.

DETAILED DESCRIPTION

Figure 1A:
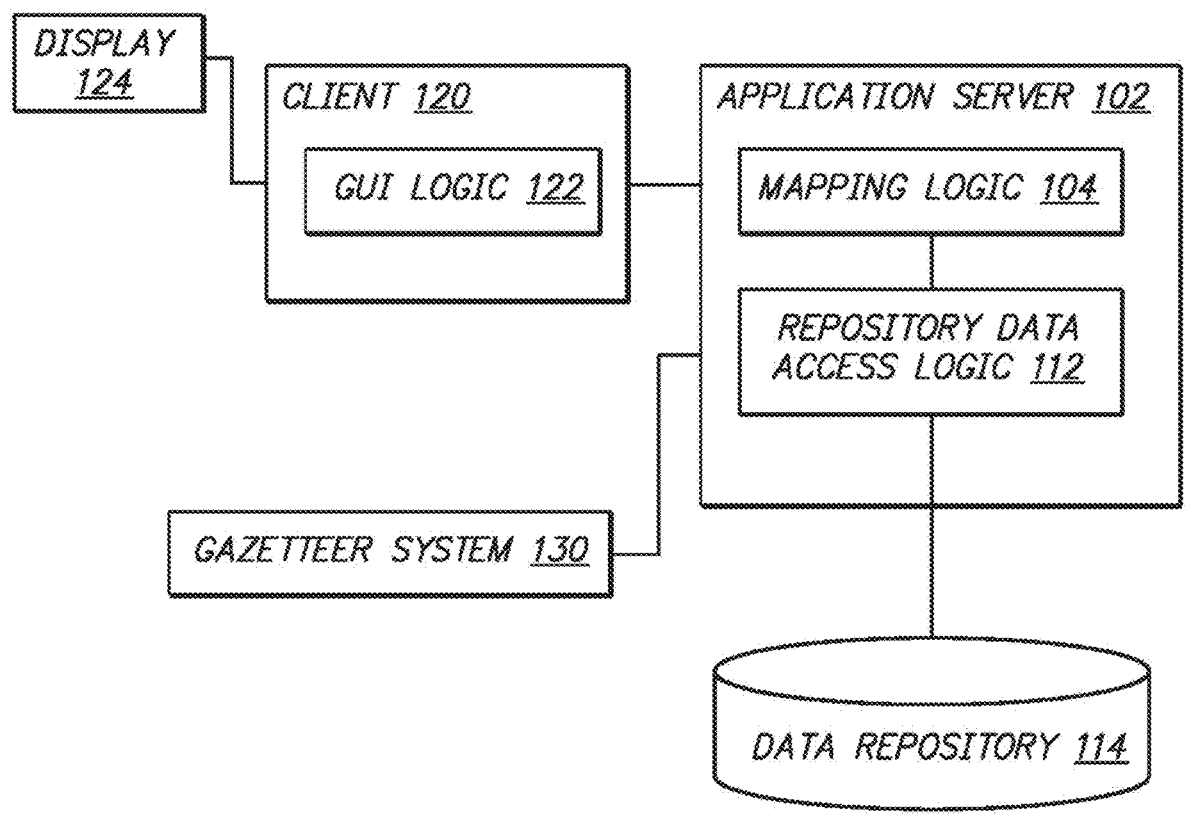
FIG. 1A illustrates an example mapping system.

Computer mapping processes for creating and displaying structured geotagged data using interactive digital geographic imagery are disclosed. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

The present disclosure is directed to processes and logic for creating and displaying structured geotagged data using interactive digital geographic imagery ("digital maps").

In one embodiment, a mapping system comprises processes and logic for creating a geo tag for existing structured data. According to one embodiment, a user creates a geo tag for a property of an existing object by selecting a geographic location on an interactive digital map and selecting the property of the existing object from a dialog presented to the user in response to selecting the geographic location. A property value is input. The object and a property may be selected from among objects and properties that have been defined in an extensible object ontology that is coupled to the processes or logic. Multiple objects may be associated with the same geographic location. Multiple instances of the same object having different property values may be associated with the same geographic location. In this way, the user can more quickly and easily create structured geotagged data than can be accomplished using typical approaches requiring the user to manually enter geographic coordinates to associate a geographic location with structured data.

In another embodiment, the mapping system comprises processes and logic for creating a geo tag for new structured data. According to an embodiment, a user creates a geo tag for a property of a new object by selecting a geographic location on an interactive digital map and entering a label name for the new object in a dialog presented to the user in response to selecting the geographic location. In this way, the mapping system allows a user to simultaneously create a geo tag and the structured data to which the tag will be associated. Further, the geo tag and the structured data can be created through a single graphical user interface dialog.

In another embodiment, the mapping system comprises processes and logic for sourcing a geo tag. According to one embodiment, the mapping system allows the user to associate a geo tag with a source of information about the geo tag such as a document, media file, hyperlink, and the like. Multiple sources may be associated with the same geographic location.

In another embodiment, the mapping system comprises processes and logic for creating a geo tag for structured data from a geographic location that is determined by submitting a query string to a gazetteer system. According to one embodiment, the mapping system allows the user to enter a query string related to a geographic location which the mapping system in turn submits to a gazetteer system. The gazetteer system returns geographic coordinates corresponding to the entered query string and the mapping system presents to the user an interactive digital map image of the Earth that corresponds to the returned geographic coordinates. The user can then geo tag structured data by selecting a geographic location on the interactive digital map and either selecting a property of an existing object from a dialog presented to the user in response to selecting the geographic location or entering a label name for the new object in a dialog.

In another embodiment, the mapping system comprises a process and logic for concurrent display of structured geotagged data superimposed on a digital map image and a histogram displaying properties of the structured geotagged data as a function of time.

In another embodiment, the mapping system comprises a process and logic for concurrent display of filtered structured geotagged data superimposed on a digital map image and a histogram displaying properties of the filtered structured geotagged data as a function of time.

In another embodiment, the mapping system comprises processes and logic for concurrent display of structured geotagged data superimposed on a digital map image. The displayed structured geotagged data fall into one or more user-selected time windows selected by interacting with a concurrently displayed histogram.

In another embodiment, the mapping system comprises processes and logic for dynamic and updated display of structured geotagged data superimposed on a digital map image. The displayed structured geotagged data fall into a user selected time window on a concurrently displayed histogram. The display of the geotagged data superimposed on the image is dynamically updated as the user adjusts the selected time window.

Example Mapping System

FIG. 1A illustrates an example mapping system comprising processes for creating and displaying structured geotagged data using interactive digital geographic imagery. Mapping system 100 comprises application server 102 and one or more clients, such as client 120. The client 120 of FIG. 1 broadly represents any host computer of an intelligence analyst, database administrator, or other user who interacts with data repository 114 through mapping logic 104. Users can access mapping logic 104 through GUI logic 122 to obtain information from data repository 114 and to obtain services of mapping logic 104. Client 120 may comprise a personal computer, workstation, or other data processing system.

In the embodiment illustrated in FIG. 1A, client 120, which may be implemented by one or more first physical computing devices, is communicatively connected to application server 102, which may be implemented by one or more second physical computing devices, over one or more networks, network links, or inter-networks. In some embodiments, each such physical computing device may be implemented as a separate computer system as show in FIG. 10. For example, client 120 may be implemented in a computer system as a set of program instructions recorded on a machine-readable storage medium, while application server 102 may be implemented in a different computer system.

Client 120 comprises graphical user interface (GUI) logic 122, GUI logic 122 may be a set of program instructions which, when executed by one or more processors of the computer system, is operable to receive user input and display one or more graphic constructs related to creating and displaying structured geotagged data using the approaches herein. GUI logic 122 may be operable to receive user input from, and display the graphic constructs to, a graphical user interface that is provided on display 124 by the computer system on which client 120 executes.

Client 120 may also interact with application server 102 to provide input, definition, editing instructions, expressions related to one or more objects or constructs as described herein using a programmatic interface. Application server 102 may use, process, log, store, or otherwise interact with the received input according to application server logic.

Application server 102 may be implemented as a computer system having the logical elements show in FIG. 1. In an embodiment, the logical elements may comprise program instructions recorded on one or more computer-readable storage media. Alternatively, the logic elements may be implemented in hardware, firmware, or a combination of hardware and software.

When executed by one or more processors of the computer system, logic in application server 102 is operable to create and display or otherwise use structured geotagged data using digital maps according to the techniques described herein. In one embodiment, application server 102 may be implemented in a Java Virtual Machine (JVM) that is executing in a distributed or non-distributed computer system. In other embodiments, application server 102 may be implemented as a combination of programming instructions written in any programming language (e.g., C++ or Visual Basic) and hardware components (e.g., memory, CPU time) that have been allocated for executing the program instructions.

In an embodiment, application server 102 comprises repository access logic 112 and mapping logic 104. Repository data access logic 112 may comprise a set of program instructions which, when executed by one or more processors, are operable to access and retrieve data including digital map data, structured data, and structured geotagged data from data repository 114. For example, repository access logic 112 may be database client or a Java Database Connectivity (JBDC) client that supports calls to a database server that manages data repository 114. Data repository 114 may be any type of structured storage for storing data including, but not limited to, relational or object-oriented databases, data warehouses, directories, data files, and any other structured data storage.

In the embodiment illustrated in FIG. 1A, mapping logic 104 comprises logic to create, read, update, and delete digital map data, structured data, and structured geotagged data in response to input from client 120. Mapping logic 104 also comprises logic for processing input from client 120 and for providing data to be rendered by GUI logic 122 on display 124 in response to client input. In one embodiment, mapping logic 104 is object-oriented logic developed using an object-oriented programming language such as the Java programming language. Further, for purposes of illustrating a clear example, certain embodiments are described with mapping logic 104 receiving input from and providing output to client 120 under control of a user. Alternatively, mapping logic 104 may define an application programming interface (API) and may receive input in the form of calls or programmatic requests from other logic, systems or software elements and may provide output in the form of responses to the calls. Thus, all description herein of user interaction with mapping logic 104 broadly encompasses programmatic interaction with mapping logic without direct user involvement.

Application server 102 may be connected to a gazetteer system 130. Gazetteer system 130 is a computer system that functions as a geographical index. In one embodiment, gazetteer system 130 receives as input a search or query string and returns a list of geographic coordinates that correspond to the inputted query string. Gazetteer system 130 may maintain a database for associating text with geographical coordinates. Gazetteer system 130 may provide an online network accessible interface that can be accessed by another computer system such as application server 102 using known or standardized network protocols such as the HyperText Transfer Protocol (HTTP). Alternatively, gazetteer system 130 may be a component of application server 102.

Figure 1B:
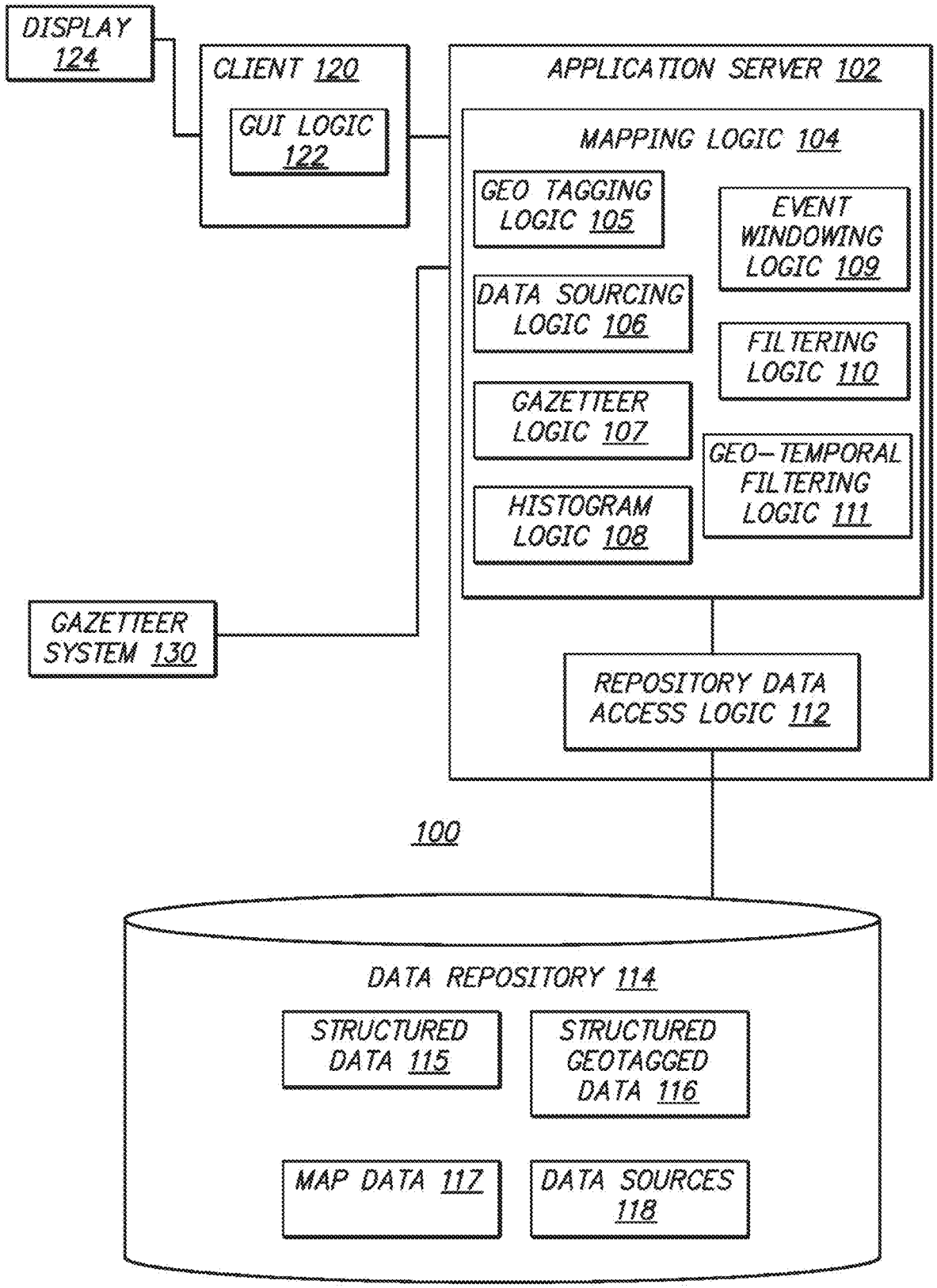
FIG. 1B illustrates an example mapping system in greater detail.

FIG. 1B illustrates the example mapping system of FIG. 1 in greater detail. As shown in FIG. 1B, mapping logic 104 comprises geo-tagging logic 105, data sourcing logic 106, gazetteer logic 107, histogram logic 108, event windowing logic 109, filtering logic 110, and geo-temporal filtering logic 111 each of which comprise logic for processing input from client 120 and for providing data to be rendered by GUI logic 122 on display 124 in response to client input.

In one embodiment, geo-tagging logic 105 implements the functions described herein for creating a geo-tag for structured data. Data sourcing logic 106 implements the functions described herein for associating data sources with structured geotagged data. Gazetteer logic 107 is configured to interact with gazetteer system 130 by submitting search queries to gazetteer system 130 and receiving in response a set of search results in the form of one or more geographic coordinates that correspond or match the given query. Gazetteer logic 107 may interoperate with geo-tagging logic 105 to implement the functions described herein for creating a geo-tag for structured data using a gazetteer system. Histogram logic 108 implements the functions described herein for concurrent display of structured geotagged data superimposed on a digital map image and a histogram displaying properties of the structured geotagged data as a function of time. Event windowing logic 109 implements the functions described herein for displaying filtered structured geotagged data according to user-selected time windows. Filtering logic 110 implements the functionality described herein for generating and displaying views of filtered structured geotagged data. Geo-temporal filtering logic 111 implements the functions described herein for generating geo-temporal displays of filtered structured geotagged data.

In an embodiment, logics 105-111 may be implemented in a single computer program or module or implemented in a fewer number of computer programs or modules than is shown in FIG. 1B. Further, portions of logic 105-111 may be implemented by computer systems other than application server 102 such as, for example, by GUI logic 122 of client 102. Thus, the structural separation of functional modules as shown in FIG. 1B is not required and the same functions described herein for such functional modules may be implemented structurally in any other convenient manner.

As shown in FIG. 1B, data repository 114 may comprise structured data 115, structured geotagged data 116, map data 117, and data sources 118. Structured data 115 and structured geotagged data 116 is described in greater detail below. Map data 117 refers data for rendering geographic images on the display 124 of client 120. Map data 117 may comprise a library of digital images comprising satellite and aerial images of the surface of the Earth. In addition, map data 117 comprises image metadata for mapping a given image coordinate from an image of the Earth to a corresponding geospatial coordinate. Data sources 118 refers broadly to any data that serves as a data source for structured data 115 or structured geotagged data 116. Non-limiting examples of data sources 118 include electronic documents, e-mails, electronic images or other media files, a reference or link such as a Uniform Resource Locator (URL) to a document available from another computer system, and the like.

Structured Data

Structured data is any data that adheres to a conceptual data model. In one embodiment, the mapping system works with structured data that adheres to a conceptual data model comprising objects and properties that are organized according to an object ontology. An object represents a real-world entity such as a person, place or thing. An object can also represent a real-world event such as a "phone call" or a "meeting". Each object may have one or more properties for describing various aspects of the object. For example, a "person" object may have an "address" property and a "phone number" property. Instances of objects may be labeled for identification. For example, an instance of a "person" object may be labeled with the person's name.

The structured data may be stored in a database managed by a computer-based database management system, such as a relational database management system (RDBMS), according to a fixed or dynamic structure of data containers (e.g., tables) and relationships. The database structure may be described using an ontology, embodied in a database schema, comprising a data model that is used to represent the structure and reason about objects and properties in the structure. In an embodiment, the ontology is provided as described in PCT international patent publication PCT/US2008/064207 A2.

In one embodiment, the mapping system works with objects and properties according to a user-specified ontology specified in terms of object types and property types. Non-limiting examples of object types include a "person" object type, a "location" object type, and an "event" object type. Non-limiting examples of property types include an "address" property type, a "phone number" property type, and a "location name" property type. Objects may have any number of properties. Objects stored as structured data in the database may be instantiated based on user-defined object types. Each property of an object stored as structured data may be instantiated based on user-defined property types. Further, object types and property types may be instantiated based on a base type. For example, a base type for a "home" object type may be a "location" object type. The object ontology may be dynamically extended during use of the mapping system described herein by entering new names of objects or new property names, causing the system to create entries for the objects or properties in the ontology.

Structured Geotagged Data

Structured geotagged data is structured data that is associated with a geo tag. A geo tag is geospatial metadata that represents a point on the surface of the Earth according to a geospatial coordinate. A geo tag may be stored in a database and associated with structured data according to a database data model such as, for example, a relational database model.

In one embodiment, a geo tag comprises an identifier of a location, and an optional date range, and may be associated with a property of an object. For example, a geo tag may be stored in a database and associated with an "address" property of a "person" object. In one embodiment, the location of a geo tag represents a point of the surface of the Earth and is stored as a latitude/longitude geospatial coordinate pair according to the World Geodetic System (WGS). However, embodiments are not limited to any particular type or format of geospatial coordinates or any particular geodetic system and a geospatial location of a geo tag may be represented using virtually any geographic coordinate system such as the Universal Transverse Mercator (UTM) coordinate system or the Military Grid Reference System (MGRS).

The optional date range may be used to specify a time period during which the location identified by a geo tag is applicable to or valid for the property associated with the geo tag. Thus the optional date range is useful for capturing a temporal aspect of a geospatial attribute of a property of an object. For example, consider an object representing a face-to-face meeting between two persons, the object having a location property whose value is the postal address of the location of the meeting. In this example, a geo tag may be stored and associated with the "location" property of the "meeting" object. In addition, the geotag may specify a date range which indicates the duration of the meeting at the location indicated by the geo tag.

Creating a Geo Tag for Structured Data

Figure 2:
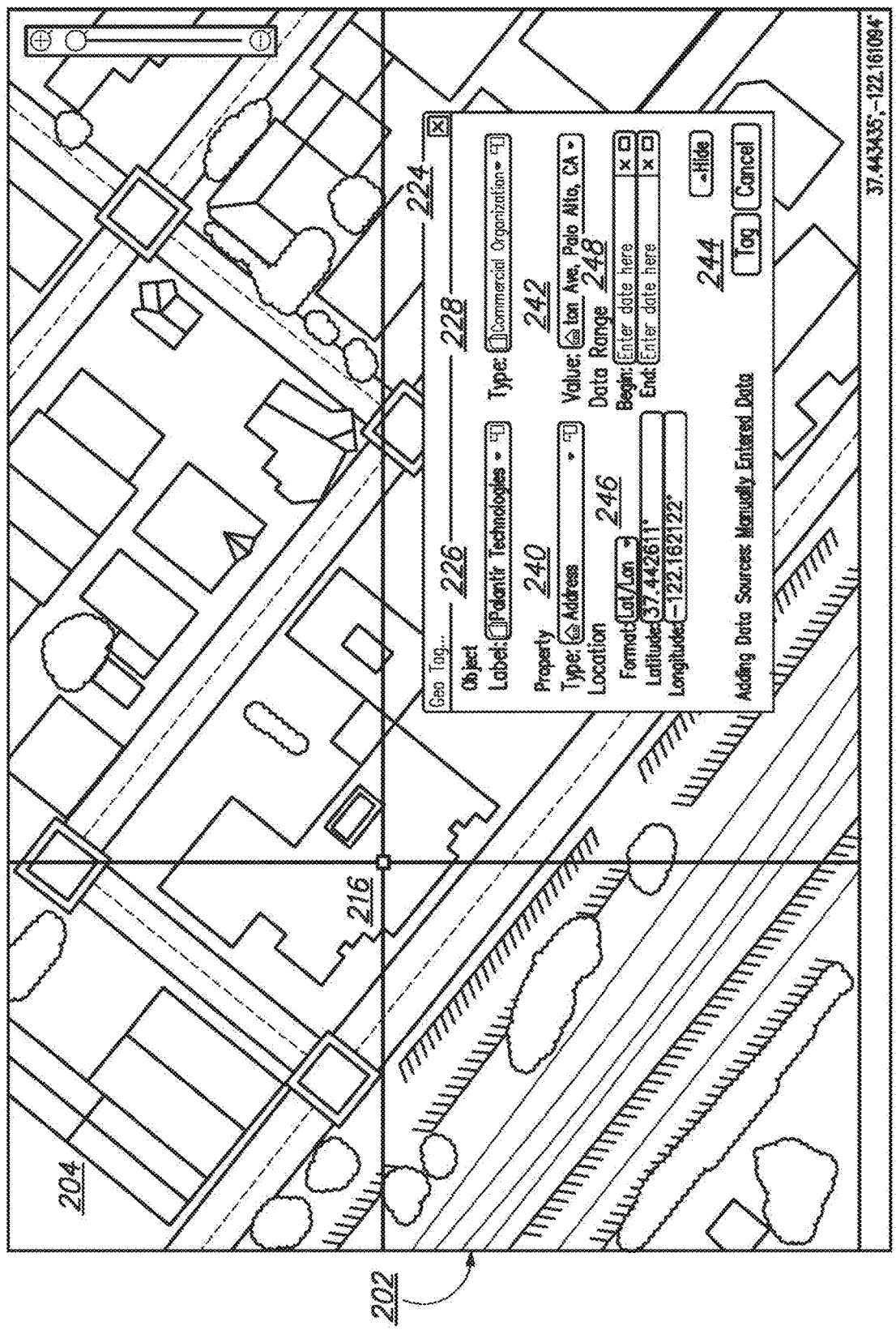
FIG. 2 is a screenshot of a graphical user interface for creating a geo tag for structured data.

FIG. 2 is a screenshot of a graphical user interface for creating a geo tag for structured data. The interface may be displayed to a user on the display of a computer system such as display 124 of client 120. The interface comprises map image window 202, map image 204, and geo tag dialog 224.

Map image 204 is a digital photograph of a particular area of the surface of the Earth at a particular altitude. The image may be captured by a satellite or aerial photography and imported into a mapping system such as mapping system 100. The interface may allow the user to select a particular map data source or map tile source from among a plurality of different map data sources all of which provide different sets of data that map the Earth or parts of the Earth. The interface may provide other interface tools (not shown) that allow a user to locate a map image for a particular surface area of the Earth at a particular altitude. For example, the initial map image presented to the user may be of the entire North American continent. The user may then use a pointing device such as a mouse or other input mechanism such as keyboard to zoom toward a particular surface region. For example, the user may zoom from an image of the North American continent to an image of the Western United States and then to an image of Northern California, to an image of Palo Alto, Calif., and finally to an image of the 100 block of Hamilton Avenue in Palo Alto, Calif.

Once the user has located the desired map image, the user may wish to associate a particular geographic location depicted by the image with an existing property of an existing object stored as structured data in a database. In one embodiment, to geo tag a property of an object, the user uses a pointing device such as mouse or other suitable input device to identify and select a geographic location on map image 204. For example, the user may direct, using an input device, a graphical pointer to a particular point on map image 204 and then select the point by clicking a mouse button. Alternatively, the user may select the geographic location by depressing a geo tag hot key while the graphical pointer is hovering over the desired geographic location on map image 204. In one embodiment, the hot key is the lowercase 't' key on a standard QWERTY keyboard. As shown in FIG. 2, the particular geographic point selected is within the area of crosshairs 216 overlaid on map image 204. The crosshairs 216 represent merely one example of how the system may indicate the selected location to a user. The area within the crosshairs 216 is arbitrary and may have any size or shape. Other forms of indication may be used such as various polygons, icons, pointers, or other user interface widgets.

In response to selecting a geographic location, geo tag dialog 224 is displayed. Dialog 224 may be used to select an object and a property of an object to associate with the selected geographic location. To select the desired object, dialog 224 provides object label control 226 and object type control 228, property type control 240, and property value control 242. Controls 226 and 228 may be used to select an existing object stored as structured data in a database based on an existing ontology, or to create a new object to be stored as structured data in the database and in the ontology.

Figure 3:
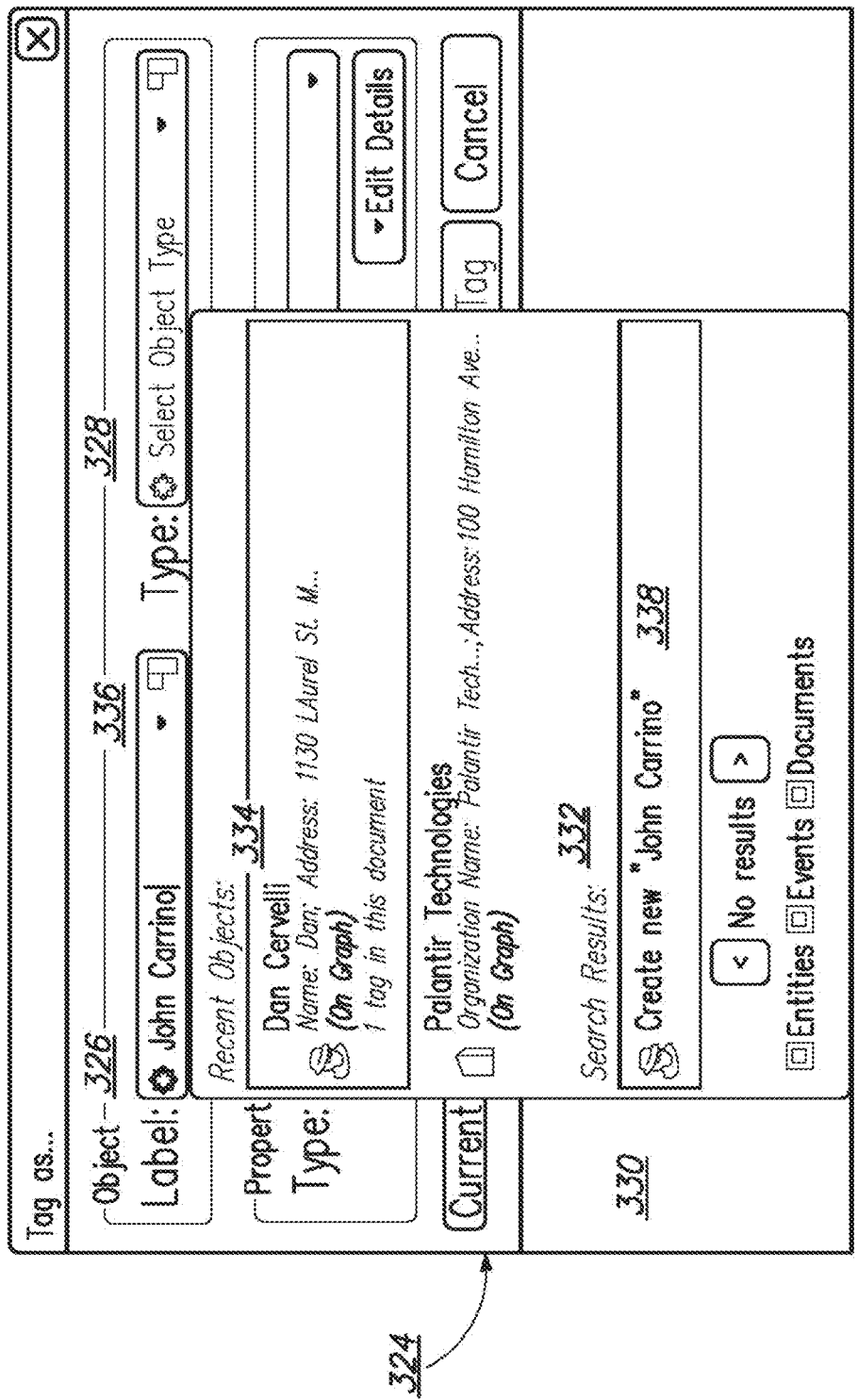
FIG. 3 is a screenshot of a graphical user interface for creating a geo tag for structured data.

Object label control 226 allows the user to search for an existing object based on a text label. Text inputted by the user into control 226 may be used by the mapping system to query objects within structured data that have labels that match or contain the inputted text. The results of the query on the structured data may be presented to the user on the interface allowing the user to select one of the results as the desired object. For example, FIG. 3 shows drop-down results panel 330 showing search results 332 resulting from a query against structured data for objects having a label matching the inputted text "John Carrino". In the example depicted by FIG. 3, no such objects were found as indicated by the "No Results" message at the bottom of panel 330. Panel 330 also contains a list of recently used objects 334 that may be selected by the user as the desired object. In one embodiment, panel 330 is presented to the user automatically as search results are available. In another embodiment, panel 330 is presented on-demand in response to user input such as, for example, in response to the user selecting the drop-down icon 336 in object label control 326.

In one embodiment, the mapping system is configured to perform an incremental search as the user inputs text in object label control 226. As the user types text into object label control 226, possible matches are presented to the user, for example, on panel 330 of FIG. 3. The immediate feedback of search results allows the user to select a desired object without having to type or input the entire label name into control 226.

In one embodiment, if no object matching the inputted label text is found, the user may create a new object with a label name equaling the inputted text. For example, control 338 on panel 330 of FIG. 3 allows the user to create a new object with the label name "John Carrino".

Returning to FIG. 2, object type control 228 indicates the current type, if any, of the object selected in object label control 226. Object type control 228 also allows the user to specify a new type for the object selected in object label control 226. In an embodiment, the types available for selection in object type control 228 are from an ontology such as the ontology described in PCT international patent publication PCT/US2008/064207 A2.

Once an object is selected or a new object is created, the user may select a property of the current object to be associated with the selected geographic location 216. To select a property of the current object the user may search for the property by value using property value control 242. As with object label control 226, the mapping system may employ an incremental search as text is entered into control 242. If the desired property value is currently not a property of the current object, then the user may create a new property of the current object by entering a new value in property value control 242. Property type control 240 may be used to select the property type of a new property value entered into control 242 or to select a new property type for an existing property value found using the search feature of control 242.

Dialog 224 also comprises location information 246 and date range information 248. Location information 246 and date range 248 comprise the geospatial data of a geo tag that is to be associated with the selected object property.

In the embodiment depicted by FIG. 2, location information 246 indicates the geospatial coordinates of the selected geographic location 216 in terms of latitude and longitude. However, location information 246 may indicate geospatial coordinates using other geospatial coordinate systems such as the Universal Transverse Mercator (UTM) coordinate system or the Military Grid Reference System (MGRS). The user may use the drop-down select box labeled "Format:" to select the desired geospatial coordinate system used to represent the geospatial location of location 216. When presenting dialog 224 to the user, mapping system automatically determines the geographic coordinate (e.g., latitude and longitude) of the selected location 216. Thus, the user does not need to enter the geospatial coordinates (e.g., latitude and longitude) of a desired geographic location in order to identify that location to the mapping system. Instead, the user may simply select or click on the desired location on the map image 204 to identify geographic location 216. Alternatively, the user may use the hot key approach for identifying a location on a map image as described previously. To automatically determine a geospatial coordinate from a user selected location on a map image, the mapping system may employ logic, such as mapping logic 104, for translating an image coordinate to a geospatial coordinate.

Date range information 248 may be specified by the user to indicate a timeframe during which the specified location 216 is applicable to the selected object property. For example, a date range could be applied to a geo tag of an "address" property of a "person" object to indicate that the person had the address of the specified location during the specified timeframe. As another example, a date range could be applied to a geo tag of an "address" of a "meeting event" object to indicate that that a meeting took place at the specified location for the specified timeframe.

Once an object and a property of the object have been selected, the user can geo tag the selected object property by clicking the "Tag" button 244 on dialog 224. Clicking button 244 causes the mapping system to store data in a database such as data repository 114 associating the indicated geospatial data 246 and 248 with the selected object property.

Sourcing Geo Tagged Properties

In an embodiment, the mapping system allows the user to source a geo tagged property. Sourcing refers to associating in a database structured data with one or more data sources. Data sources may include manually entered data, electronic documents, e-mails, electronic images or other media files, other computer systems, and the like.

Figure 4:
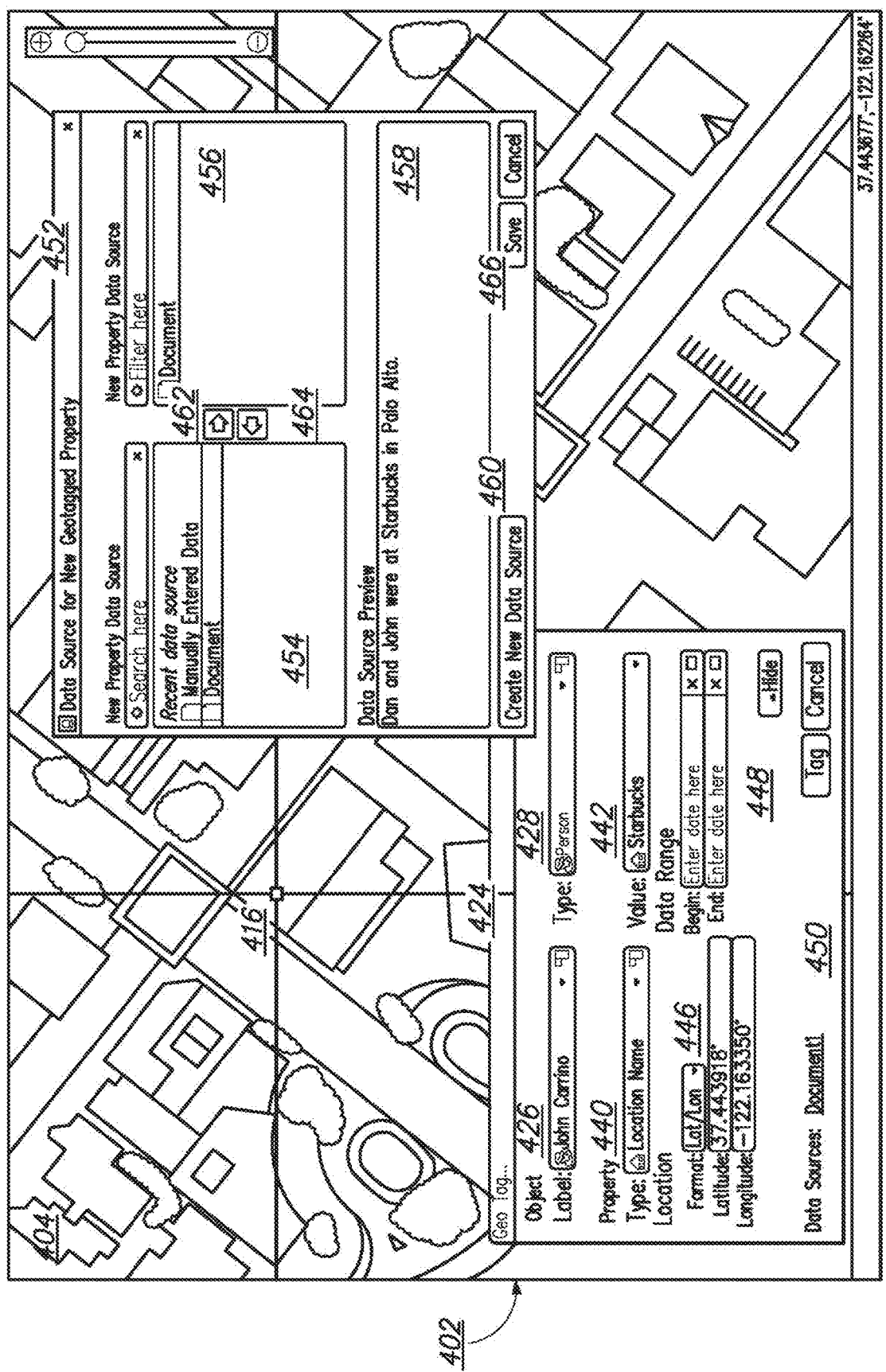
FIG. 4 is a screenshot of a graphical user interface for sourcing a geo tagged property.

FIG. 4 is a screenshot of a graphical user interface for sourcing a geo tagged property. The interface may be displayed to a user on the display of a computer system such as display 124 of client 120. The interface comprises map image window 402, map image 404, geo tag dialog 424, and data sources dialog 452.

In an embodiment, data sources dialog 452 is displayed in response to the user selecting an active data source link 450 on geo tag dialog 424. With data sources dialog 452, the user can associate one or more data sources with a new geotagged property. To associate one or more data source with a new geotagged property, data source dialog 452 provides available data sources panel 454 and selected data sources panel 456. With available data sources panel 454 the user may enter text to search for existing data sources. In one embodiment, a list of recently used data sources appears in available data sources panel 454.

Selected data sources panel 456 lists the data sources to be associated with the new geotagged property. The user can add data sources to the selected data sources list 456 by selecting one or more data sources listed in the available data sources panel 454 and then selecting arrow 462. The user can remove data sources from the selected data sources list 456 by selecting one more data sources listed in the selected data sources panel 456 and then selecting arrow 464. The user has the operation to create a new data source by selecting button 460 if the desired data source has not yet been entered into the mapping system.

Data source preview pane 458 provides the user with a preview of the currently selected data source in available data sources panel 454.

Once the user has selected the desired data sources to associate with the new geotagged property, the user selects the save button 466. Clicking button 466 causes the mapping system to store data in a database such as data repository 114 associating selected data sources 456 with the selected object property as indicated by controls 426, 428, 440, and 442 on dialog 424. The user may repeat the foregoing process any number of times for any number of data sources.

Associating data sources with a geo tagged property provides numerous benefits in comparison to prior approaches. For example, in a government application, a user could associate multiple intelligence reports about a particular individual with a location that the individual is known to reside, have a place of business, or have another form of association. In a geneology application, a user could associate multiple images of historical documents with a present or historical location associated with a historical person. In a municipal building and planning application, a user could associate construction permit documents, construction plans, correspondence, and other images or documents with a map location indicating a residence or other building. Consequently, with the techniques herein a map becomes a sophisticated data analysis tool that may be richly associated with a diverse universe of documents, media files, or other data.

Gazetteer

Figure 5:
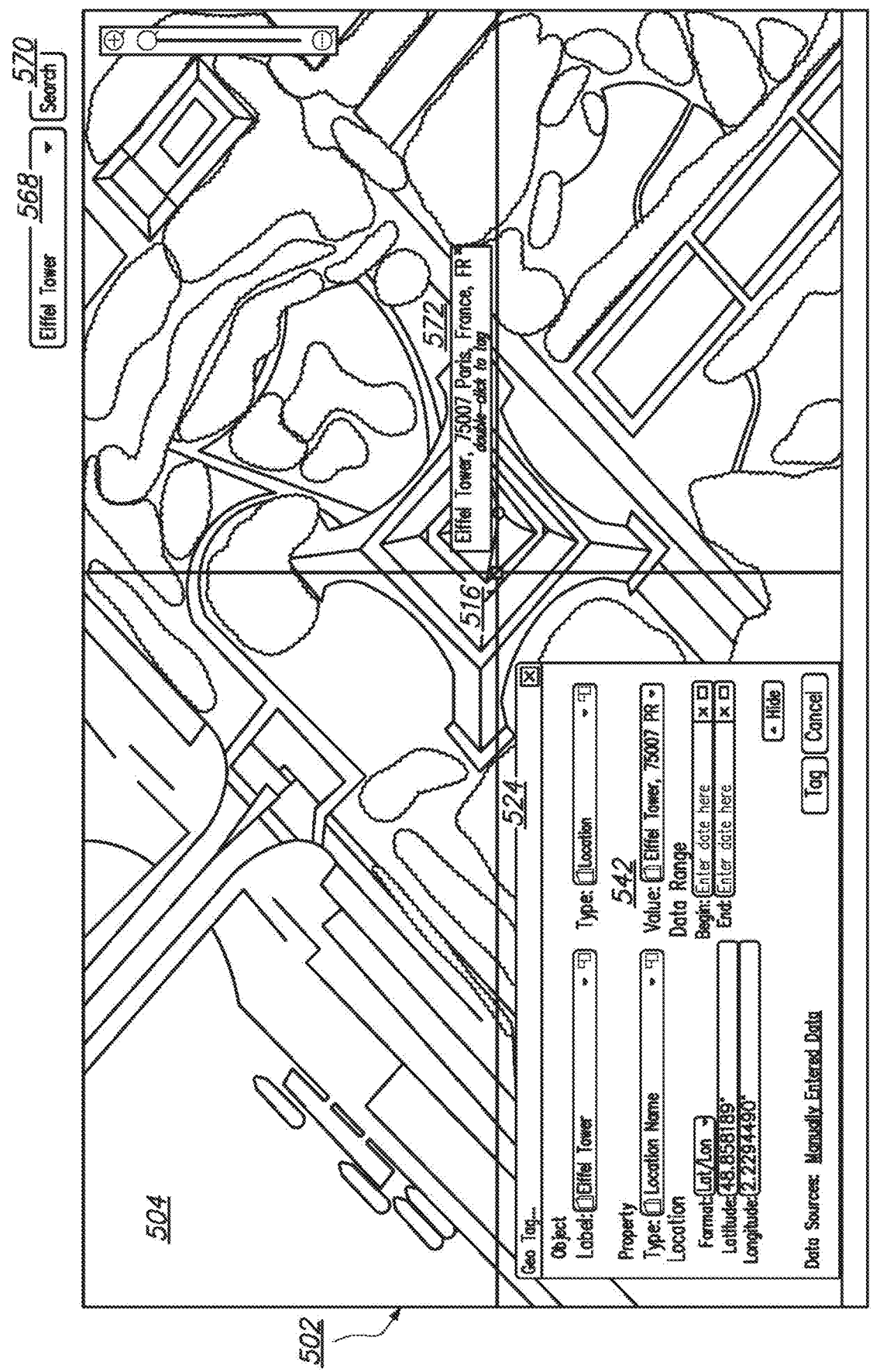
FIG. 5 is a screenshot of a graphical user interface for creating a geo tag for structured data using a gazetteer system.

FIG. 5 is a screenshot of a graphical user interface for creating a geo tag for structured data using a gazetteer system. A gazetteer system is a computer system that functions as a geographical index. In one embodiment, the gazetteer system receives as input a search or query string and returns a list of geographic coordinates that correspond to the inputted query string. The gazetteer system may maintain a database for associating text with geographical coordinates. The gazetteer system may provide an online network accessible interface that can be accessed by another computer system such as the mapping system of the present disclosure using known or standardized network protocols such as the HyperText Transfer Protocol (HTTP). Alternatively, the gazetteer system may be a component of the mapping system itself.

The interface of FIG. 5 comprises map image window 502, map image 504, geo tag dialog 524, search field 568, and search button 570. The interface may be displayed to a user on the display of a computer system such as display 124 of client 120.

A process for creating a geo tag for structured data using a gazetteer system proceeds generally as follows. Initially, the user enters one or more keywords into search field 568. The one or more keywords may be textual description of the geographic location the user desires to geo tag. For example, in the example embodiment depicted in FIG. 5, the user is interested in geo tagging the location of the "Eiffel Tower".

After entering one or more keywords in to search field 568 and upon selecting the search button 570, mapping system submits the search keyword(s) to a gazetteer system. The gazetteer system returns to the mapping system one or more geographic coordinates that correspond to the given search keyword(s). In one embodiment, upon receiving the geographic coordinate(s) from the gazetteer system, mapping system displays to the user a map image 504 showing all the geographic locations that match the given search keyword (s). In another embodiment, depending on the number of matches and the geographical distance between the matches, the mapping system displays a map image 504 showing only a subset of all the geographic locations that match the given search keyword(s). Each geographic coordinate returned from the gazetteer system that is displayed in the map image 504 is flagged with a location identifier flag 572.

To create a geo tag for structured data for the location identified by flag 572, the user may select a flag 572, for example, by double-clicking with a pointing device on the graphical area of flag 572. Selecting a flag 572 causes geo tag dialog 524 to appear. The user may then use dialog 524 to select an object property to associate with the location 516. In one embodiment, the default property value presented in property value control 542 is a string value returned from the gazetteer system in response to submitting the inputted search keywords to the gazetteer system.

Event Histogram

Figure 6:
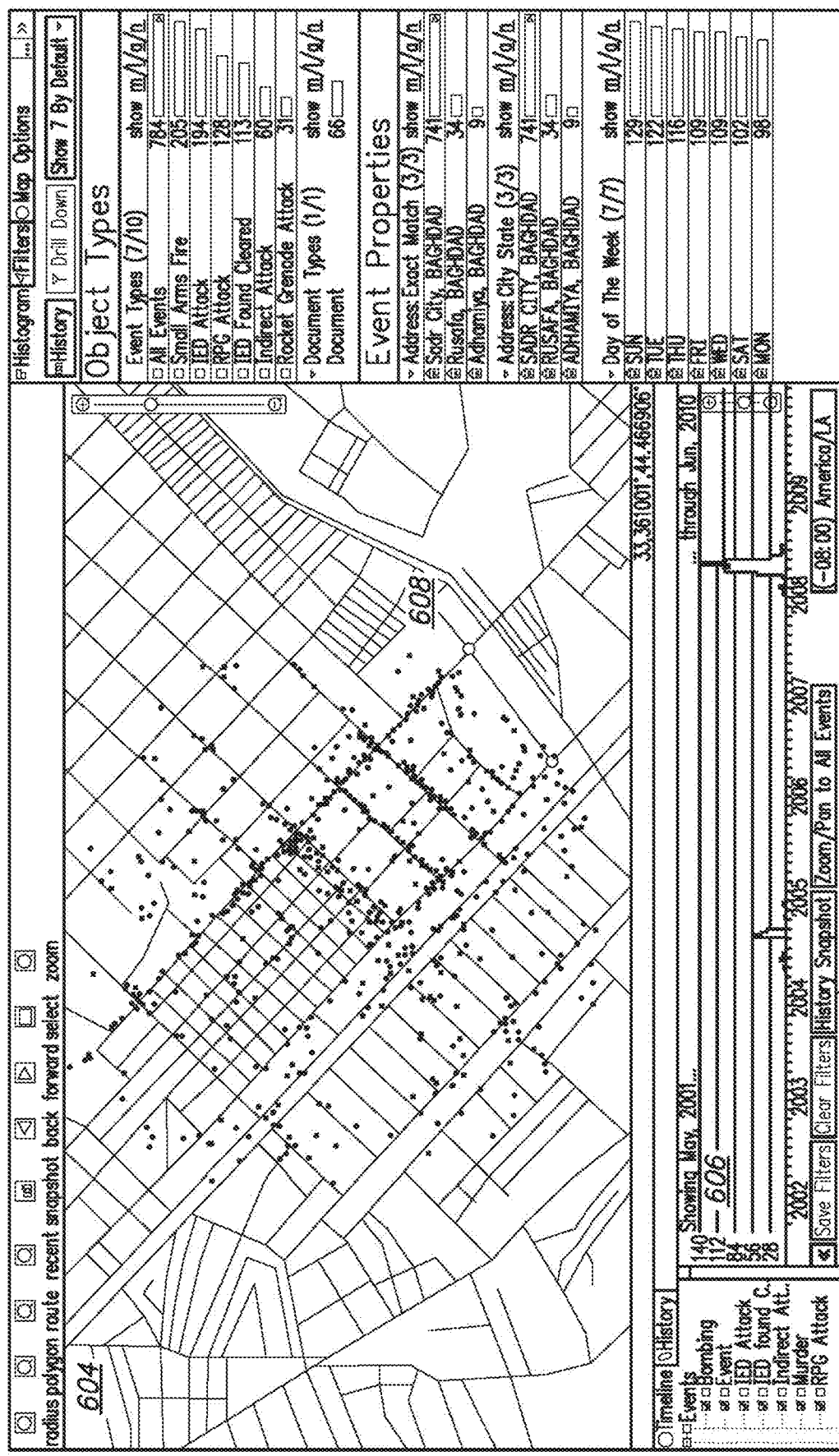
FIG. 6 is a screenshot of a graphical user interface for displaying structured geotagged data.

FIG. 6 is a screenshot of a graphical user interface 600 for displaying structured geotagged data. The interface may be displayed to a user on the display of a computer system such as display 124 of client 120. Interface 600 comprises map image window 602, map image 604, and histogram 606.

According to one embodiment, interface 600 allows a user to view the locations of geo tagged events that occurred during a period time. The location of each event is indicated on interface 600 as a superimposed dot 608 on map image 604. Interface 600 also provides a histogram 606 showing the distribution of the occurrence of the events shown on map image 604 over the period of time. Histogram 606 allows the user to quickly determine when the events shown on map image 604 occurred. For example, a user viewing the example interface 600 depicted in FIG. 6 could easily determine that most of the events plotted on map image 604 occurred in the spring of 2008 and the early fall of 2004.

Filtering Events

Figure 7:
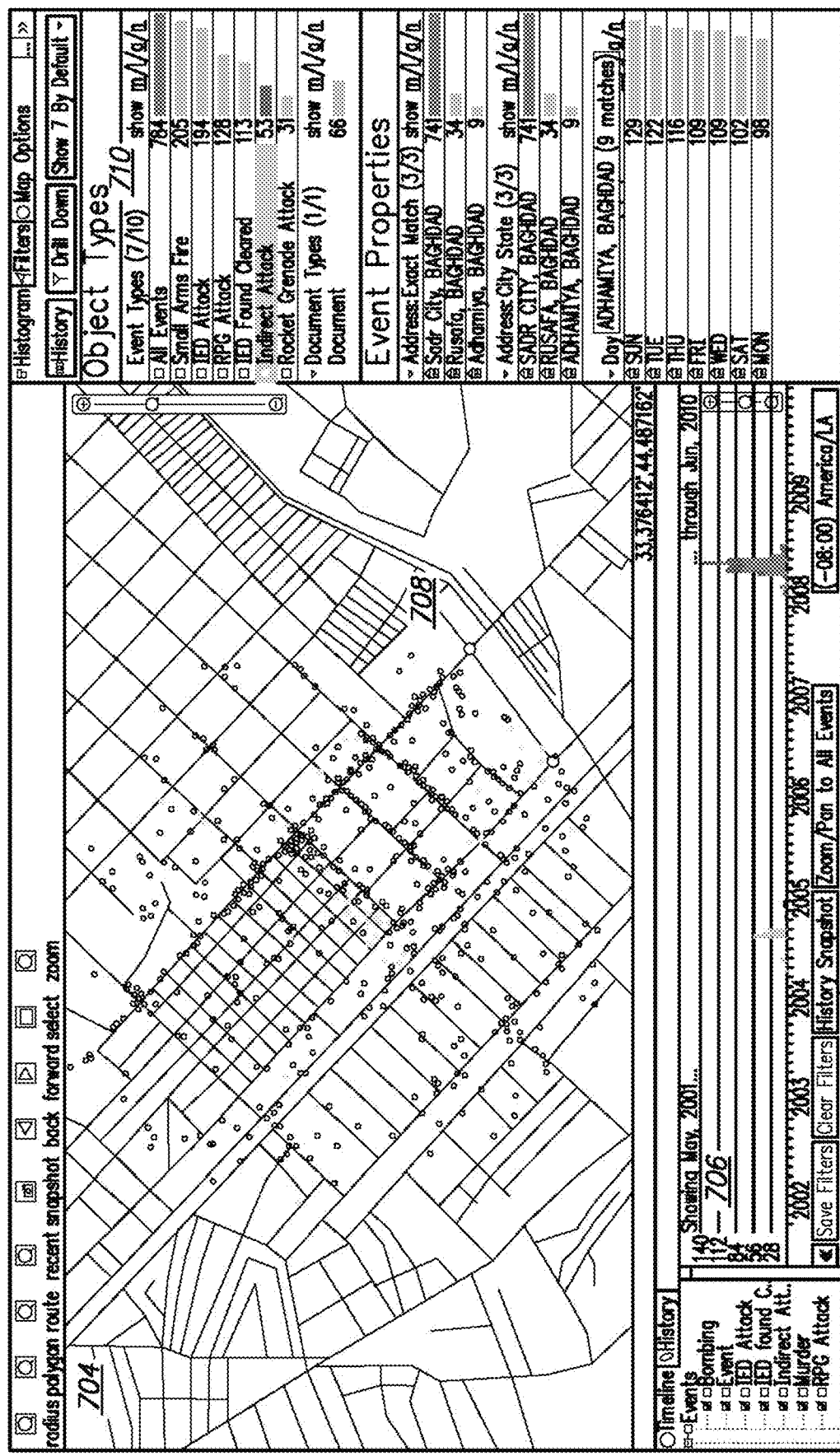
FIG. 7 is a color screenshot of a graphical user interface for displaying filtered structured geotagged data.

FIG. 7 is a screenshot of a graphical user interface 700 for displaying filtered structured geotagged data. The interface may be displayed to a user on the display of a computer system such as display 124 of client 120. Interface 700 comprises map image window 702, map image 704, histogram 706, and event type filtering panel 710.

According to one embodiment, interface 700 allows a user to filter geo tagged events displayed to the user based on the type of event. In one embodiment, the type of event may be selected from event type filtering panel 710. In the example embodiment depicted in FIG. 7, the "Indirect Attack" event type is selected in panel 710.

In one embodiment, selecting an event filtering type in panel 710 causes the mapping system to indicate on map image 704 the locations of the geo tagged events that correspond to the selected event type. For example, in the example embodiment depicted in FIG. 7, selecting the "Indirect Attack" event type on panel 710 causes the superimposed dots 708 on map image 704 that correspond to locations of "Indirect Attack" events to appear as yellow dots. All other events appear as white dots so that the locations of the selected event type can be visually distinguished from all other event types.

In another embodiment, instead of showing both the locations of selected event types and non-selected event types as superimposed dots 708 on map image 704, selecting an event type in panel 710 causes the mapping system to indicate on map image 704 only the locations of the geo tagged events that correspond to the selected event type. For example, instead of showing both the locations of the "Indirect Attack" event type (yellow dots) and the locations of all other event types (white dots), selecting the "Indirect Attack" event type in panel 710 causes the mapping system to superimpose a dot 708 on map image 704 only for the locations of "Indirect Attack" events.

Interface 700 also provides a histogram 706 showing the distribution of the occurrence of the events shown on map image 704 over a period of time. The bars of the histogram may be color coded to visually indicate the number of events of a particular type that occurred during a particular time. For example, in the example embodiment depicted by FIG. 7, the color of the bars on histogram 706 indicate that all "Indirect Attack" events occurred during 2004 while virtually all other events occurred in early 2008.

Event Time Windows

Figure 8:
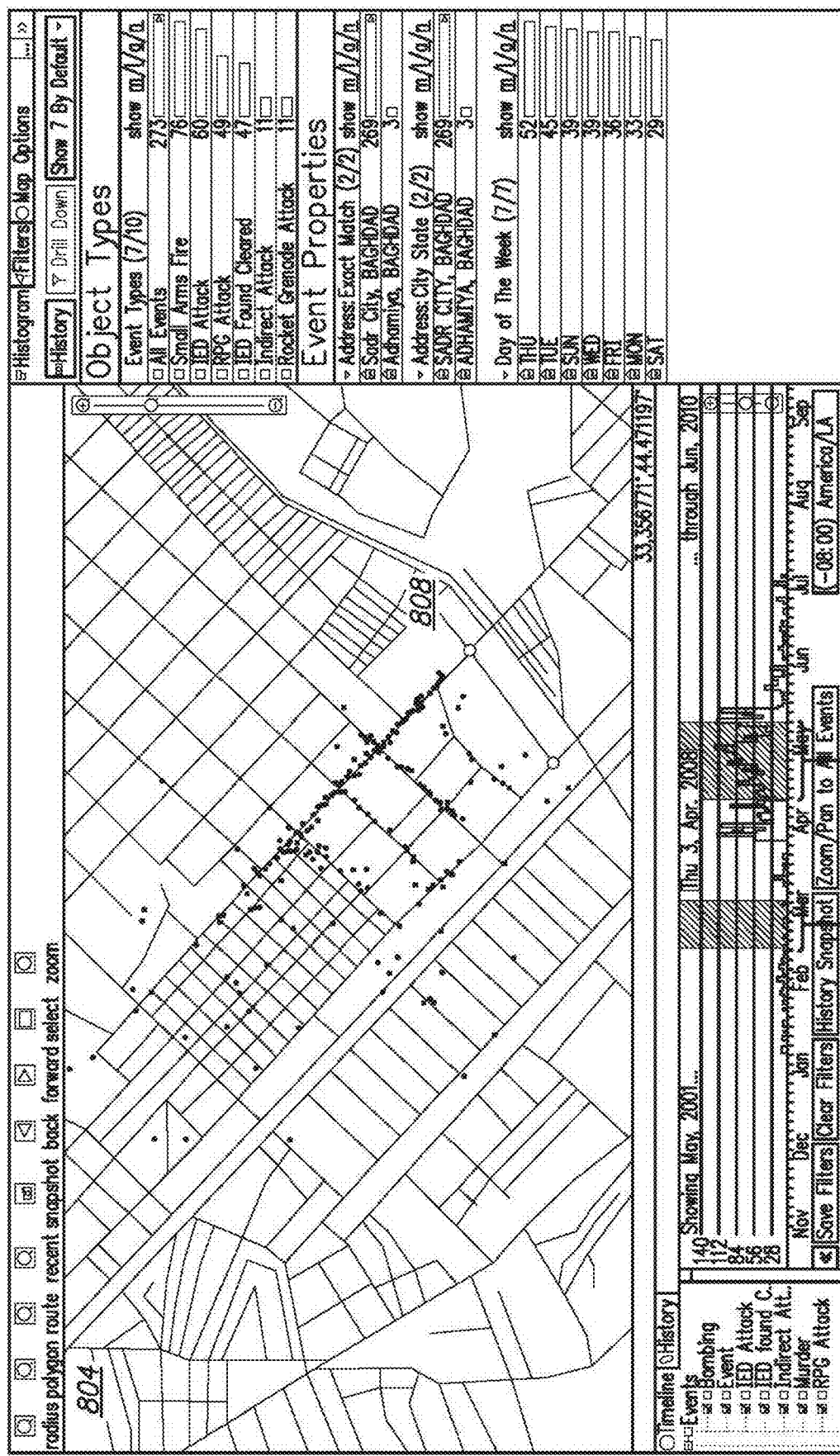
FIG. 8 is a screenshot of a graphical user interface for displaying filtered structured geotagged data.

FIG. 8 is a screenshot of a graphical user interface 800 for displaying filtered structured geotagged data. The interface may be displayed to a user on the display of a computer system such as display 124 of client 120. Interface 800 comprises map image window 802, map image 804, histogram 806.

According to one embodiment, the user can select one or more time windows on the histogram 806. By selecting one or more time windows the user can command the mapping system to show on map image 804 the locations of only those events that occurred during the selected time window (s). In one embodiment, to select a time window, the user uses a pointing device to select a first time boundary on the histogram timeline, drags the pointing device to a second point on the histogram timeline, and then releases the pointing device to select a second time boundary. The area between the selected first time boundary and the second time boundary represents the selected time window. In one embodiment, the time window is shaded to give a visual indication with respect to a histogram timeline of the start date, end date, and duration of the time window.

In one embodiment, a user can make multiple discontinuous time window selections. To do so the user may depress a designated keyboard key while making second and any subsequent time window selections so as to preserve the existing time window selections. In one embodiment, the designated keyboard key is the "Alt" key or the "Ctrl".

In one embodiment, as time windows are selected by the user on the histogram 806, the mapping system updates the display of map image 804. In particular, the mapping system updates the display of map image 804 to show the locations of only those events that fall within the selected time window. For example, in the example embodiment depicted in FIG. 8, only the locations of the events that fall within time windows 812A and 812B are designated with superimposed dots 808 on map image 804.

Geo-Temporal Views of Events

Figure 9A:
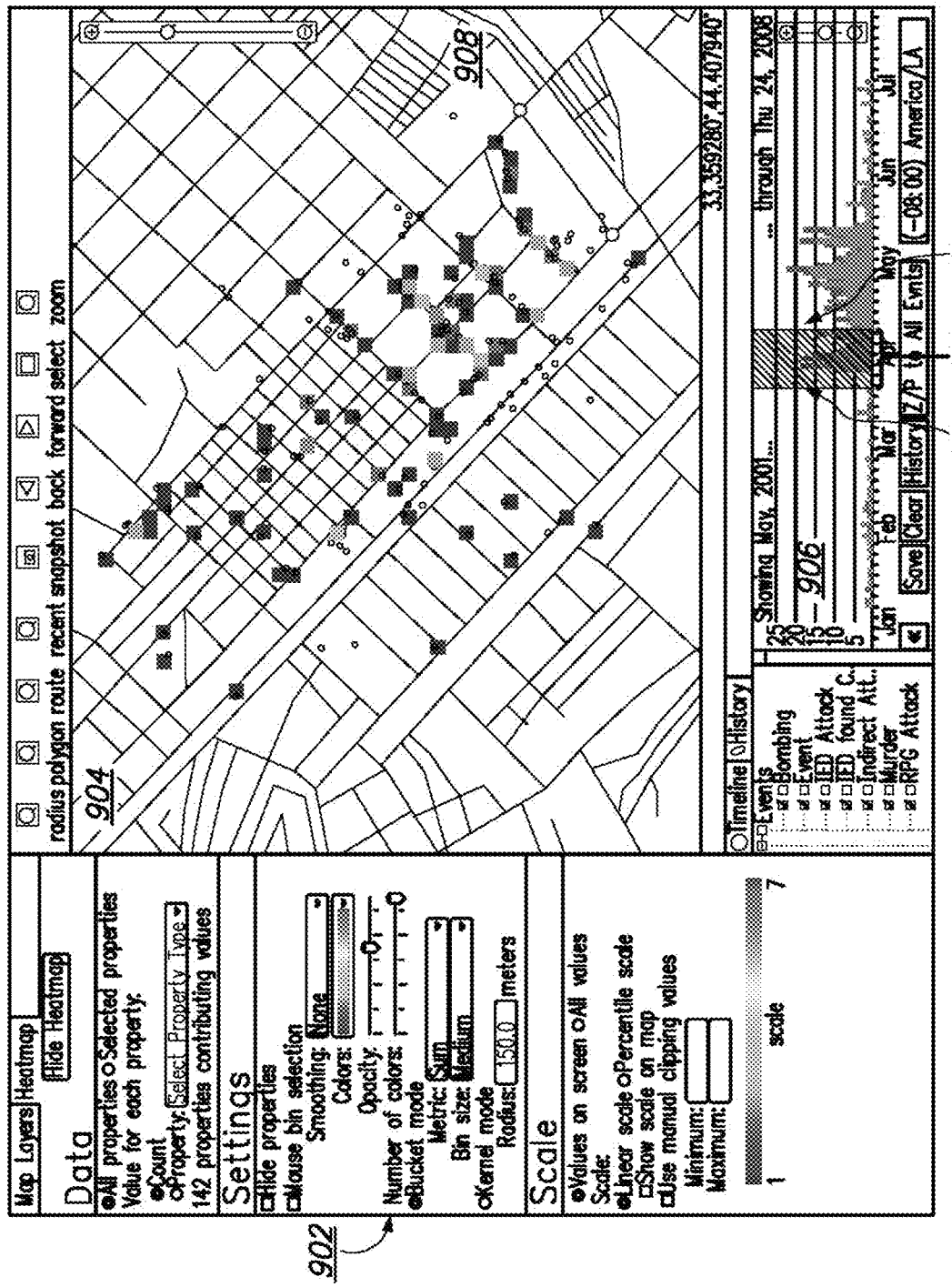
FIG. 9A and FIG. 9B are color screenshots of a graphical user interface for displaying filtered structured geotagged data.
Figure 9B:
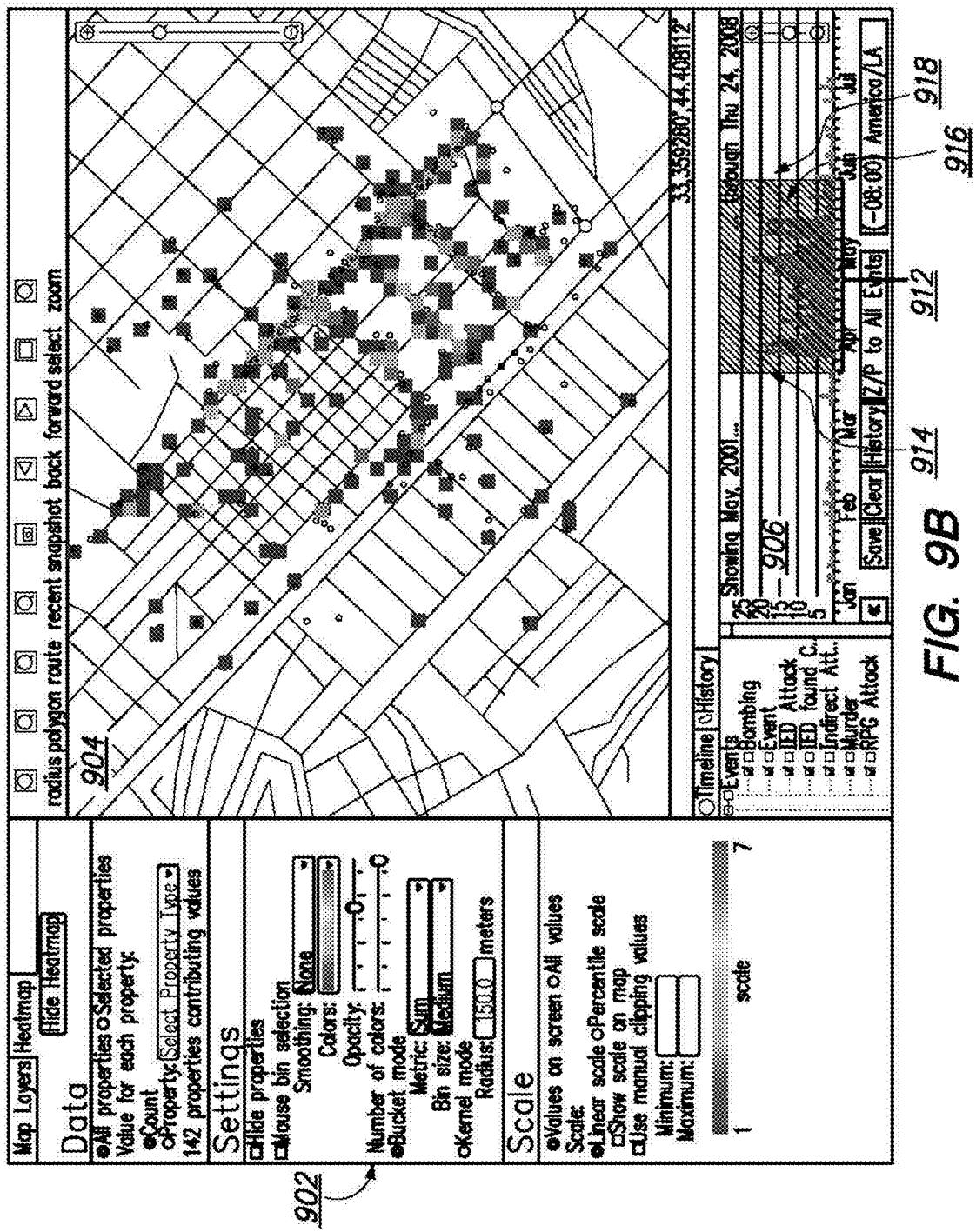

FIGS. 9A and 9B are screenshots of a graphical user interface 900 for displaying filtered structured geotagged data. The interface may be displayed to a user on the display of a computer system such as display 124 of client 120. Interface 900 comprises map image window 902, map image 904, and histogram 906.

According to one embodiment, the user can select an initial time window on the histogram 906 and then drag a boundary of the initial time window using a pointing device to expand or contract the time window. As the user expands or contracts the time window by dragging a boundary of the time window, the mapping system continuously updates the map image 904 to show the locations of the events that fall within the time window as the time window is expanded and contracted. In this way, the user can create a geo-temporal view of events that give the user a sense of the progression of the location of events over a period of time.

In the example embodiment depicted in FIG. 9A, initial time window 912 has a start time boundary 914 and an end time boundary 916. The duration of the time window 912 is visually indicated as a grayed rectangular portion of histogram 906 between boundary 914 and boundary 916. As shown in FIG. 9A, the locations of events that fall within time window 912 are shown on map image 904 as a heat map. The colors of the heat map indicate the relative density of events that occurred at a particular location during time window 912. Cooler colors (e.g., blue) indicate a relatively few number of events at a particular location and hotter colors (e.g., red) indicate a relatively larger number of events at a particular location.

FIG. 9B shows time window 912 after the user has dragged the rightmost boundary of the time window 912 from boundary position 916 to boundary position 918. Map image 904 is updated to indicate the locations of the events that occurred within time window 912 as defined by the new boundaries 914 and 918. Further, according to an embodiment, as the user drags the rightmost boundary of time window 912 from boundary 916 to boundary 918 the mapping system continuously updates map image 904 to indicate the locations of the events that occurred within the time window.

In another embodiment, instead of creating a geo-temporal view of events based on an expanding or contracting time window, the user can create a geo-temporal view of events based on a sliding time window in which as the user drags time window such that both the left most boundary and the right most boundary slide along with the window. As the user drags the sliding time window, the mapping system continuously updates map image 904 to indicate the location of events that occurred within the boundaries of the sliding time window.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Extensions and Alternatives

In the foregoing specification, embodiments of the invention have been described with reference to numerous specific details that may vary from implementation to implementation. For example, certain embodiments have been described with respect to geo tagging locations on the Earth, but other embodiments may be applied to geo tagging other kinds of locations or other planetary bodies. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of geotagging data comprising:
    causing display of a map image;
    receiving user input identifying at least one point on the map image and, in response, causing display of a single user interface dialog comprising:
        first controls for selecting a data object of a plurality of data objects stored in a database;
        second controls for selecting a property of a data object selected through said first controls;
        third controls for creating an association between the identified location and a property selected through said second controls of a data object selected through said first controls;
    receiving, through said first controls, a selection of a particular data object stored in the database to associate with the identified location through a selected property of the particular data object;
    receiving, through said second controls, a selection of a particular property of the particular data object selected through said first controls; and
    in response to activation of said third controls, creating, in the database, an association between the identified location and the particular property selected through said second controls of the particular data object selected through said first controls;
    displaying fourth controls for creating an association between the association created between the identified location and the property and one or more data sources;
    receiving, through said fourth controls, a selection of a particular data source and, in response, storing, in the database, an association between identified location, particular property, and particular data source;
    wherein the method is performed by one or more processors.

2. The method of claim 1, wherein said first controls include controls for entering a text string, and wherein receiving, through said first controls, a selection of the particular data object comprises:
    receiving a text string entered through said first controls;
    querying said database for data objects that satisfy the received text string;
    causing display of a search results panel presenting one or more selectable items corresponding to one or more data objects stored in said database that satisfy the received text string;
    receiving through said search results panel a selection of one of the one or more selectable items, wherein the selectable item, selected through the search results panel, corresponds to the particular object.

3. The method of claim 1, wherein said first controls include controls for entering a text string, the method further comprising:
    receiving a text string entered through said first controls;
    querying said database for data objects that satisfy the received text string;
    causing display of a search results panel that provides controls for creating a new data object in the database using the received text string; and
    in response to input received through said third controls, creating an association between the identified location and a property created through said second controls of a data object created through the controls on said search results panel.

4. The method of claim 1, wherein said single user interface dialog comprises additional controls for selecting a type of the data object selected through said first controls.

5. The method of claim 1, wherein the second controls for selecting a property of the data object selected through said first controls comprises controls for creating a new property of a data object selected through said first controls.

6. The method of claim 5, wherein the controls for creating a new property of the data object selected through said first controls comprises controls for entering a type of the new property and controls for entering a value of the new property.

7. The method of claim 1, wherein said single user interface dialog displays the identified location according to a coordinate system.

8. The method of claim 7, wherein said single user interface dialog comprises additional controls for selecting a coordinate system of a plurality of coordinate systems for displaying the identified location.

9. The method of claim 1, wherein said single user interface dialog comprises controls for editing the identified location.

10. The method of claim 1, wherein said single user interface dialog comprises additional controls for specifying a date range within which the identified location is applicable to the property selected through said second controls of a data object selected through said first controls.

11. One or more non-transitory computer readable media storing instructions which, when executed by one or more processors, cause performance of:
    causing display of a map image;
    receiving user input identifying at least one point on the map image and, in response, causing display of a single user interface dialog comprising:
        first controls for selecting a data object of a plurality of data objects stored in a database;
        second controls for selecting a property of a data object selected through said first controls;
        third controls for creating an association between the identified location and a property selected through said second controls of a data object selected through said first controls;
    receiving, through said first controls, a selection of a particular data object stored in the database to associate with the identified location through a selected property of the particular data object;
    receiving, through said second controls, a selection of a particular property of the particular data object selected through said first controls; and
    in response to activation of said third controls, creating, in the database, an association between the identified location and the particular property selected through said second controls of the particular data object selected through said first controls;
    displaying fourth controls for creating an association between the association created between the identified location and the property and one or more data sources;

receiving, through said fourth controls, a selection of a particular data source and, in response, storing, in the database, an association between identified location, particular property, and particular data source.

12. The one or more non-transitory computer readable media of claim 11, wherein said first controls include controls for entering a text string, and wherein receiving, through said first controls, a selection of the particular data object comprises:
   receiving a text string entered through said first controls;
   querying said database for data objects that satisfy the received text string;
   causing display of a search results panel presenting one or more selectable items corresponding to one or more data objects stored in said database that satisfy the received text string;
   receiving through said search results panel a selection of one of the one or more selectable items, wherein the selectable item, selected through the search results panel, corresponds to the particular object.

13. The one or more non-transitory computer readable media of claim 11, wherein said first controls include controls for entering a text string, and wherein the instructions, when executed by the one or more processors, further cause performance of:
   receiving a text string entered through said first controls;
   querying said database for data objects that satisfy the received text string;
   causing display of a search results panel that provides controls for creating a new data object in the database using the received text string; and
   in response to input received through said third controls, creating an association between the identified location and a property created through said second controls of a data object created through the controls on said search results panel.

14. The one or more non-transitory computer readable media of claim 11, wherein said single user interface dialog comprises additional controls for selecting a type of the data object selected through said first controls.

15. The one or more non-transitory computer readable media of claim 11, wherein the second controls for selecting a property of the data object selected through said first controls comprises controls for creating a new property of a data object selected through said first controls.

16. The one or more non-transitory computer readable media of claim 15, wherein the controls for creating a new property of the data object selected through said first controls comprises controls for entering a type of the new property and controls for entering a value of the new property.

17. The one or more non-transitory computer readable media of claim 11, wherein said single user interface dialog displays the identified location according to a coordinate system.

18. The one or more non-transitory computer readable media of claim 17, wherein said single user interface dialog comprises additional controls for selecting a coordinate system of a plurality of coordinate systems for displaying the identified location.

19. The one or more non-transitory computer readable media of claim 11, wherein said single user interface dialog comprises controls for editing the identified location.

20. The one or more non-transitory computer readable media of claim 11, wherein said single user interface dialog comprises additional controls for specifying a date range within which the identified location is applicable to the property selected through said second controls of a data object selected through said first controls.

* * * * *